(12) United States Patent
Bluhm et al.

(10) Patent No.: US 7,941,431 B2
(45) Date of Patent: May 10, 2011

(54) ELECTRONIC DOCUMENT REPOSITORY MANAGEMENT AND ACCESS SYSTEM

(75) Inventors: Mark Bluhm, Cottage Grove, MN (US); Bruce Getting, Roseville, MN (US); Mark Hayft, Apple Valley, MN (US); Shirley Walz, Hastings, MN (US)

(73) Assignee: Thomson Reuters Global Resources, Zug (CH)

( * ) Notice: Subject to any disclaimer, the term of this patent is extended or adjusted under 35 U.S.C. 154(b) by 782 days.

(21) Appl. No.: 11/433,261

(22) Filed: May 12, 2006

(65) Prior Publication Data

US 2006/0294077 A1 Dec. 28, 2006

Related U.S. Application Data

(63) Continuation of application No. 10/289,782, filed on Nov. 7, 2002, now Pat. No. 7,085,755.

(51) Int. Cl.
*G06F 17/30* (2006.01)

(52) U.S. Cl. .............. 707/736; 707/781; 707/E17.008

(58) Field of Classification Search .............. 707/3, 736, 707/781, E17.008, 999.003
See application file for complete search history.

(56) References Cited

U.S. PATENT DOCUMENTS

| | | | |
|---|---|---|---|
| 5,414,854 A | 5/1995 | Heninger et al. ................ 713/1 |
| 5,488,725 A | 1/1996 | Turtle et al. ..................... 707/5 |
| 5,544,320 A | 8/1996 | Konrad ........................ 709/203 |
| 5,625,818 A | 4/1997 | Zarmer et al. ............ 707/104.1 |
| 5,644,720 A | 7/1997 | Boll et al. ..................... 709/227 |
| 5,644,776 A | 7/1997 | DeRose et al. ................ 715/234 |
| 5,694,334 A | 12/1997 | Donahue et al. .............. 709/247 |
| 5,696,901 A | 12/1997 | Konrad ........................ 709/203 |
| 5,708,806 A | 1/1998 | DeRose et al. ............ 707/104.1 |
| 5,710,887 A | 1/1998 | Chelliah et al. ................ 705/26 |
| 5,745,899 A | 4/1998 | Burrows ....................... 707/102 |
| 5,793,966 A | 8/1998 | Amstein et al. .............. 709/203 |
| 5,799,284 A | 8/1998 | Bourquin ....................... 705/26 |
| 5,802,518 A * | 9/1998 | Karaev et al. ..................... 707/9 |
| 5,815,665 A * | 9/1998 | Teper et al. ................... 709/229 |
| 5,819,092 A * | 10/1998 | Ferguson et al. ............. 717/113 |
| 5,845,278 A * | 12/1998 | Kirsch et al. ..................... 707/3 |
| 5,907,836 A * | 5/1999 | Sumita et al. .................... 707/2 |
| 5,920,860 A | 7/1999 | Maheshwari et al. ........... 707/5 |
| 5,930,799 A | 7/1999 | Tamano et al. ............... 707/102 |
| 5,941,944 A | 8/1999 | Messerly ...................... 709/203 |
| 5,974,444 A | 10/1999 | Konrad ........................ 709/203 |
| 5,978,779 A | 11/1999 | Stein et al. ..................... 705/37 |
| 5,983,248 A | 11/1999 | DeRose et al. ................ 715/234 |

(Continued)

FOREIGN PATENT DOCUMENTS

JP 2000-057154 2/2000

(Continued)

OTHER PUBLICATIONS

Ebenhoch, "Legal Knowledge Representation using the Resource Description Framework", IEEE 2001, pp. 369-372. (Provided by Applicant).*

(Continued)

*Primary Examiner* — Hung T Vy
*Assistant Examiner* — Phuong-Thao Cao
(74) *Attorney, Agent, or Firm* — Dorsey & Whitney LLP

(57) ABSTRACT

A system and a method providing for the distribution and management of a large corpus of value added electronic documents while providing customized services to a plurality of diverse end users.

23 Claims, 21 Drawing Sheets

U.S. PATENT DOCUMENTS

| | | | | |
|---|---|---|---|---|
| 5,987,497 | A | 11/1999 | Allgeier | 709/201 |
| 6,028,605 | A * | 2/2000 | Conrad et al. | 715/840 |
| 6,029,175 | A | 2/2000 | Chow et al. | 707/104.1 |
| 6,055,544 | A | 4/2000 | DeRose et al. | 707/104.1 |
| 6,061,678 | A | 5/2000 | Klein et al. | 707/3 |
| 6,085,220 | A | 7/2000 | Courts et al. | 709/201 |
| 6,148,299 | A | 11/2000 | Yoshimoto | 707/8 |
| 6,148,301 | A * | 11/2000 | Rosenthal | 1/1 |
| 6,185,614 | B1 | 2/2001 | Cuomo et al. | 709/224 |
| 6,208,988 | B1 * | 3/2001 | Schultz | 707/5 |
| 6,230,205 | B1 | 5/2001 | Garrity et al. | 709/231 |
| 6,233,592 | B1 | 5/2001 | Schnelle et al. | 715/205 |
| 6,286,000 | B1 | 9/2001 | Apte et al. | |
| 6,298,342 | B1 | 10/2001 | Graefe et al. | 707/4 |
| 6,304,864 | B1 | 10/2001 | Liddy et al. | 706/15 |
| 6,304,892 | B1 | 10/2001 | Bhoj et al. | 709/202 |
| 6,353,849 | B1 | 3/2002 | Linsk | 709/203 |
| 6,360,215 | B1 * | 3/2002 | Judd et al. | 707/3 |
| 6,360,249 | B1 | 3/2002 | Courts et al. | 709/203 |
| 6,370,571 | B1 | 4/2002 | Medin, Jr. | 709/218 |
| 6,401,118 | B1 | 6/2002 | Thomas | 709/224 |
| 6,418,441 | B1 | 7/2002 | Call | 707/10 |
| 6,424,980 | B1 | 7/2002 | Iizuka et al. | |
| 6,449,639 | B1 | 9/2002 | Blumberg | 709/217 |
| 6,493,731 | B1 * | 12/2002 | Jones et al. | 715/234 |
| 6,515,312 | B1 | 2/2003 | Chen et al. | 257/99 |
| 6,546,385 | B1 * | 4/2003 | Mao et al. | 707/3 |
| 6,631,369 | B1 * | 10/2003 | Meyerzon et al. | 707/4 |
| 6,631,496 | B1 * | 10/2003 | Li et al. | 715/200 |
| 6,638,314 | B1 | 10/2003 | Meyerzon et al. | 715/234 |
| 6,643,652 | B2 | 11/2003 | Helgeson et al. | 707/10 |
| 7,054,841 | B1 | 5/2006 | Tenorio | 705/57 |
| 7,085,755 | B2 | 8/2006 | Bluhm et al. | 707/3 |
| 7,162,483 | B2 | 1/2007 | Friman | 707/102 |
| 7,181,438 | B1 * | 2/2007 | Szabo | 707/2 |
| 7,284,191 | B2 * | 10/2007 | Grefenstette et al. | 715/230 |
| 7,318,090 | B1 * | 1/2008 | Fairman et al. | 709/223 |
| 7,346,668 | B2 * | 3/2008 | Willis | 709/219 |
| 2001/0029458 | A1 * | 10/2001 | Tsuda et al. | 705/1 |
| 2002/0035482 | A1 * | 3/2002 | Coble et al. | 705/1 |
| 2002/0059566 | A1 | 5/2002 | Delcambre et al. | 717/146 |
| 2002/0083006 | A1 * | 6/2002 | Headings et al. | 705/59 |
| 2002/0161800 | A1 * | 10/2002 | Eld et al. | 707/512 |
| 2003/0014447 | A1 * | 1/2003 | White | 707/530 |
| 2003/0014483 | A1 * | 1/2003 | Stevenson et al. | 709/203 |
| 2003/0032409 | A1 * | 2/2003 | Hutcheson et al. | 455/414 |
| 2003/0046182 | A1 * | 3/2003 | Hartman | 705/26 |
| 2003/0055850 | A1 * | 3/2003 | Larsen | 707/500 |
| 2003/0088685 | A1 * | 5/2003 | Lee | 709/230 |
| 2003/0093790 | A1 * | 5/2003 | Logan et al. | 725/38 |
| 2003/0135553 | A1 * | 7/2003 | Pendakur | 709/205 |
| 2003/0149737 | A1 * | 8/2003 | Lambert et al. | 709/214 |
| 2003/0182310 | A1 * | 9/2003 | Charnock et al. | 707/104.1 |
| 2003/0217121 | A1 * | 11/2003 | Willis | 709/219 |
| 2004/0064431 | A1 * | 4/2004 | Dorner et al. | 707/1 |
| 2004/0148278 | A1 * | 7/2004 | Milo et al. | 707/3 |
| 2005/0021467 | A1 * | 1/2005 | Franzdonk | 705/51 |
| 2005/0096920 | A1 * | 5/2005 | Matz et al. | 705/1 |
| 2005/0278793 | A1 * | 12/2005 | Raley et al. | 726/28 |
| 2005/0289145 | A1 * | 12/2005 | Voegel | 707/9 |
| 2006/0036934 | A1 * | 2/2006 | Fujiwara | 715/500 |
| 2006/0080314 | A1 * | 4/2006 | Hubert et al. | 707/5 |
| 2008/0275839 | A1 * | 11/2008 | Zabawskyj et al. | 707/1 |

FOREIGN PATENT DOCUMENTS

| | | |
|---|---|---|
| JP | 2000-172716 | 6/2000 |
| JP | 2000-348061 | 12/2000 |
| JP | 2001-282812 | 10/2001 |
| WO | 9715018 A1 | 4/1997 |
| WO | WO 01/96978 | 12/2000 |
| WO | WO 01/73607 | 10/2001 |

OTHER PUBLICATIONS

Luotonen, A. et al: "World-Wide Web Proxies", Computer Networks and ISDN Systems, 1994, pp. 147-154, vol. 27, No. 2, North Holland Publishing, Amsterdam, NL.

Ebenhoch, Peter: "Legal Knowledge Representation using the Resource Description Framework", Database and Expert Systems Applications, 2001, IEEE, Sep. 3, 2001, pp. 369-373.

Bray, T.: "What is RDF?," http://www.xml.com/pub/a/2001/01/24/rdf.html>, Jan. 24, 2001, 6 pp.

* cited by examiner

| Node GUID: Label | Doc GUID: Content |
|---|---|
| N1: News | |
| N2: Business | |
| N3: Sports | |
| N4: Jordan | DG1: Jordan's endorsements |
| N5: Baseball | DG2: World Series Game 5 |
| N6: Basketball | DG1: Jordan's endorsements |

ELECTRONIC DOCUMENT REPOSITORY MANAGEMENT AND ACCESS SYSTEM

CROSS REFERENCE TO RELATED APPLICATIONS

The application is a continuation of and claims benefit under 35 U.S.C. §119(e) to U.S. patent application Ser. No. 10/289,782, now U.S. Pat. No. 7,085,755, filed Nov. 7, 2002 issued Aug. 1, 2006, entitled "Electronic Document Repository Management and Access System", the contents of which are incorporated herein by reference in their entirety.

FIELD OF THE INVENTION

The present invention relates to the distribution and management of data, particularly documents, in large scale electronic data repositories and software applications created to access and utilize the data repositories.

BACKGROUND OF THE INVENTION

With the use of computers and web-based applications, ever greater amounts of information can be made accessible on-line to end users. In the recent past, on-line databases were specialized in content, covering only a particular type of records, such as trademarks, or technical articles in a particular field. Thus, the databases and access tools were particularly designed with that content in mind. A user with multiple information needs was faced with an environment as shown in FIG. 1. Each information need required working with a separate system and its particular user interface, providing access to a particular database (or set of related databases), serviced by access and billing software particular to that information resource. The improvements in mass storage capacity and speed have permitted databases to grow enormously in size and allowed a single provider to offer multiple databases.

However, the increase in size of collections of computerized information and the expectations of users for speed in retrieval and user-friendly forms of use and document delivery create challenges for information providers. The legacy user interfaces and access systems are often user-friendly only to those highly accustomed to using them, and most user interfaces and access systems tailored to particular content have differences between them that make it hard for a user of one system to move easily to a system for other content. Even if users can accept the differences, the operators have not found it efficient to simply load separate legacy systems on faster processors with larger storage devices.

In addition, using one legacy system to access and share the database of another system is usually difficult, if not impossible. Even if legacy databases can be shared between legacy systems, other inefficiencies may arise. Often, the same information is requested by different users for different purposes. Thus, the same information may be made available through multiple research resources or channels (such as a legal or financial document service, versus a news service) to different types of users. To make the same information available through multiple resources, the data is often duplicated and stored in separate databases. Further, different user inquiry applications, including associated user interfaces, may be used to access each separate database. This arrangement is typically inefficient, because it requires duplicate development and support efforts and duplicate storage of the information. Moreover, it makes difficult any changes to existing systems in response to changed customer relationships or marketplace conditions.

For the information provider, two basic objectives are maximizing the information available for sale to users and maximizing flexibility in vending the information. These goals mean that the information provider can appeal to many different kinds of users, offer different levels of access and modes of delivery and deliver information that is tailored in content and format. Pursuing these objectives permits the information provider greater flexibility in matching different users with different products and pricing, and in taking on new content and customers.

To address these objectives, there is a need for a centralized information database and information management system that allows multiple users to access the same information from different applications, web-based and otherwise. There is a further need for an efficient architecture/infrastructure model for building such applications to access large aggregations of electronically stored documents.

BRIEF SUMMARY OF THE INVENTION

The present invention, in one embodiment, is a system for maintaining a large aggregation of electronically stored documents and making them available to users that submit inquiry messages.

In another embodiment, the present invention is a system for maintaining a large aggregation of electronically stored documents and making them available to users that submit inquiry messages, comprising at least one data collection for storing documents in electronic form, each document having a unique identifier. The system also includes an intake component for receiving new documents to be added to the at least one data collection and an enrichment component for processing a received document to enrich the document. The system further includes a user interface component for receiving at least one user inquiry message seeking information from the data collection, a search component for processing the at least one user inquiry message to identify documents in the data collection that are responsive and retrieving an identifier for documents that are responsive and a delivery component responsive to a user document request for delivering a requested document.

In another embodiment, the present invention is a system for processing inquiry messages comprising one or more user interfaces for entering inquiry messages, each of said one or more user interfaces being adapted to a resource application, one or more data collections for storing documents for delivery to a user in response to an inquiry message and one or more metadata files for holding metadata for facilitating searches for documents stored in the one or more data collections. The system further includes a new document intake component for processing documents that are to be added to the one or more data collections, the intake component having metadata extractors to develop metadata from a new document and to store at least a portion of the metadata in the metadata files substantially simultaneously with storing the new document in the one or more data collections.

In another embodiment, the present invention is a method for delivering to users that submit inquiry messages inquiry results and documents selected from a large aggregation of electronically stored documents. The method comprises providing access to at least one user interface for eliciting from a user an inquiry message in electronic form seeking documents stored in electronic form in a data collection, each document having a unique identifier and providing for the inquiry message to be delivered to a search component for processing the inquiry message to identify documents in the data collection that are responsive and retrieving an identifier for documents that are responsive. The method further includes providing to the user in response to the inquiry message a search result message identifying one or more documents and in response to a user message that selects a document from the search result message, delivering the selected document to the user in a predetermined format based on a user profile associated with the user, which may be embodied in a resource application. The method also includes associating with the selected document a point-in-time attribute, to permit detection of an updated version of the selected document.

In another embodiment, the present invention is a computer data signal embodied in a transmission medium for facilitating delivery to users that submit inquiry messages, inquiry results and documents selected from a large aggregation of electronically stored documents, comprising a code component for presenting at least one user interface for eliciting from a user an inquiry message in electronic form seeking documents stored in electronic form in a data collection, each document having a unique identifier. The medium also includes a code component providing for the inquiry message to be delivered to a search component for processing the inquiry message to identify documents in the data collection that are responsive and retrieving an identifier for documents that are responsive and a code component for providing to the user in response to the inquiry message a search result message identifying one or more documents. The medium also includes a code component responsive to a user message selecting a document from the search result message, for delivering the selected document to the user in a predetermined format based on a user profile associated with the user and associating with the selected document a point-in-time attribute, to permit the detection of an updated version of the selected document.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

A. System Overview

Figure 1:
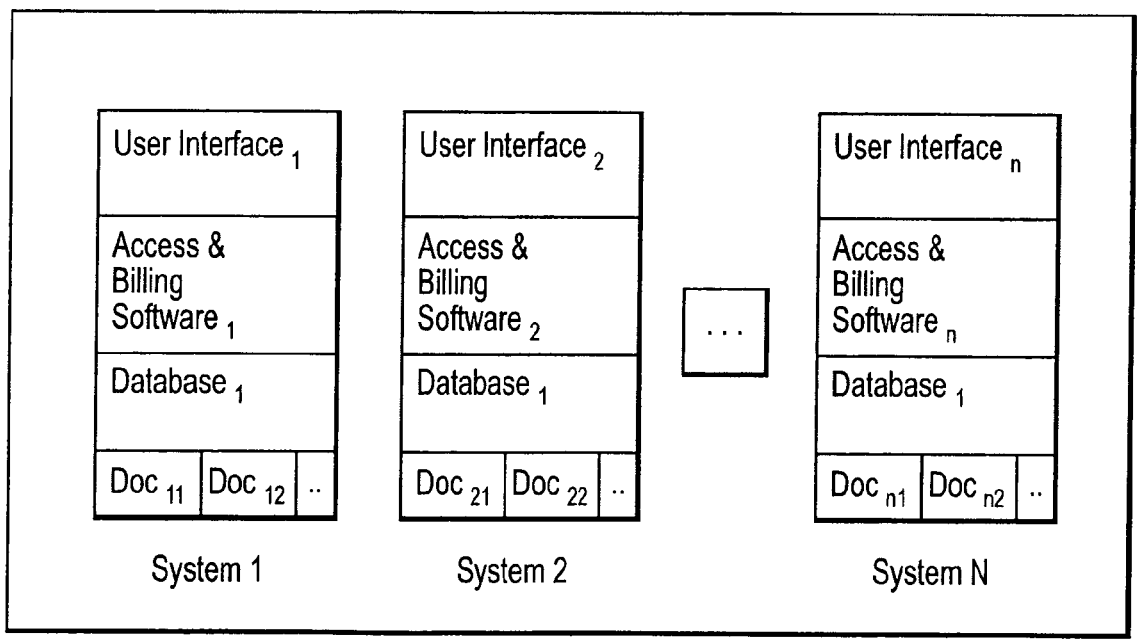
FIG. 1 is a schematic block diagram showing prior art information retailing systems.
Figure 2:
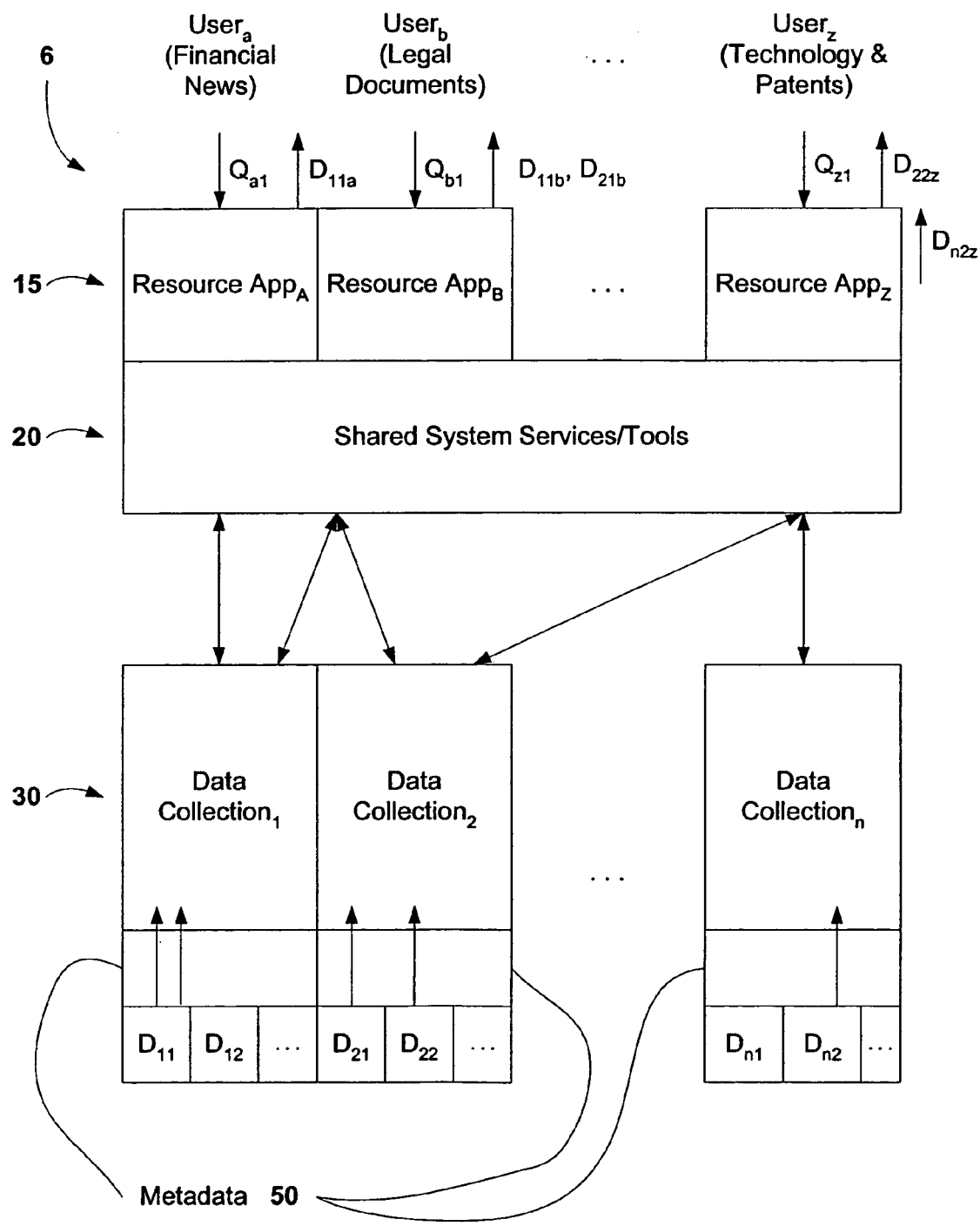
FIG. 2 is a schematic block diagram showing how the system of the present invention employs separate applications that use common resources (shared services) to provide differentiated user services based on shared access to multiple data collections.

FIG. 2 is a block diagram showing how the system of the present invention uses common resources or shared system services to provide users 6 differentiated information resource services based on shared access to multiple data collections 30 with metadata 50. More specifically, FIG. 2 shows how multiple users 6, for example, User$_a$ interested in financial news, User$_b$ interested in legal documents and User, interested in technology and patent documents might interact with the system. (These subjects of interest are examples; users may be interested in broad areas of legal, tax, accounting, medical, scientific intellectual property, educational course material or news information or in specialized sectors within those fields.) Each user sends a respective user inquiry message, $Q_{a1}$, $Q_{b1}$ and $Q_{z1}$, which is received by the user's respective resource application software 15, e.g., Resource APP$_A$, Resource APP$_B$, and Resource App$_z$, each of which is designed to serve the particular document needs of the user who subscribes to and purchases access to that information resource. Each of the resource applications 15 (Resource APP$_A$, Resource APP$_B$, and Resource App$_z$) passes the respective user inquiry message $Q_{a1}$, $Q_{b1}$ and $Q_{z1}$ on to a set of shared system services/tools 20, software and hardware that perform a variety of functions needed to provide the information resource features comprising each research resource.

For purposes of an overview, the more important shared services/tools are the searching service, which processes the user inquiries and attempts to find one or more documents responsive to the inquiry, and the security, accounting and business services that make possible the retail sale of information. The shared searching service analyzes the contents of the appropriate data collections 30 (including associated metadata 50), each of which includes one or more documents with associated metadata 50. For simplicity, each data collection is shown as having only two documents. Thus, Data Collection$_1$ has documents $D_{11}$, $D_{12}$, Data Collection$_2$ has documents $D_{21}$, $D_{22}$ and Data Collection$_n$ has documents $D_{n1}$, $D_{n2}$. Although each user might have a subscription that provides access to only one data collection 30 and each user's accessible data collection might be distinct from that of the others, the system is not so limited. In the example of FIG. 2, User$_a$ has sent an inquiry that accesses Data Collection$_1$ while User$_b$ has sent an inquiry that accesses both Data Collection$_1$ and Data Collection$_2$. Further, User, has sent an inquiry that accesses both Data Collection$_2$ and Data Collection$_2$.

User$_a$ receives document $D_{11a}$ from Data Collection$_1$ in response to its inquiry $Q_{a1}$. $D_{11a}$ as delivered is a particular form and format of the document stored as $D_{11}$, based on the features of Resource APP$_A$. User$_b$ receives two documents in response to its inquiry $Q_{b1}$, document $D_{11}$ from Data Collection$_1$ (which is the same document as was responsive to inquiry $Q_{a1}$) and document $D_{21}$ from Data Collection$_2$. As shown in FIG. 2, document $D_{11}$ as delivered to User$_{21}$ may be given a characteristic form or format $D_{11a}$ determined by Resource APP$_A$ that is not the same as the form or format $D_{11b}$ in which Resource APP$_B$ delivers the document stored as $D_{11}$. User$_z$ also receives two documents in response to inquiry $Q_{z1}$, document $D_{22}$ from Data Collection$_2$ and document $D_{n2}$ from Data Collection$_n$. Again, Resource App$_z$ delivers each of these documents in a particular form and format of the document stored as $D_{22}$ and $D_{n2}$, namely, $D_{22z}$ and $D_{n2z}$, based on the features of Resource App$_Z$. Thus, FIG. 2, shows that two different resource applications 15 may each access the same data collection 30 and may in fact access the same document in that collection. Further, FIG. 2 shows that each resource application 15 makes use of the shared system services/tools 20 but may cause a document as delivered to its user to differ somewhat in form and format from the delivered form/format of that same document as delivered by another resource application. Resources at the services and data levels are shared, but results delivered to users may be differentiated.

Figure 3:
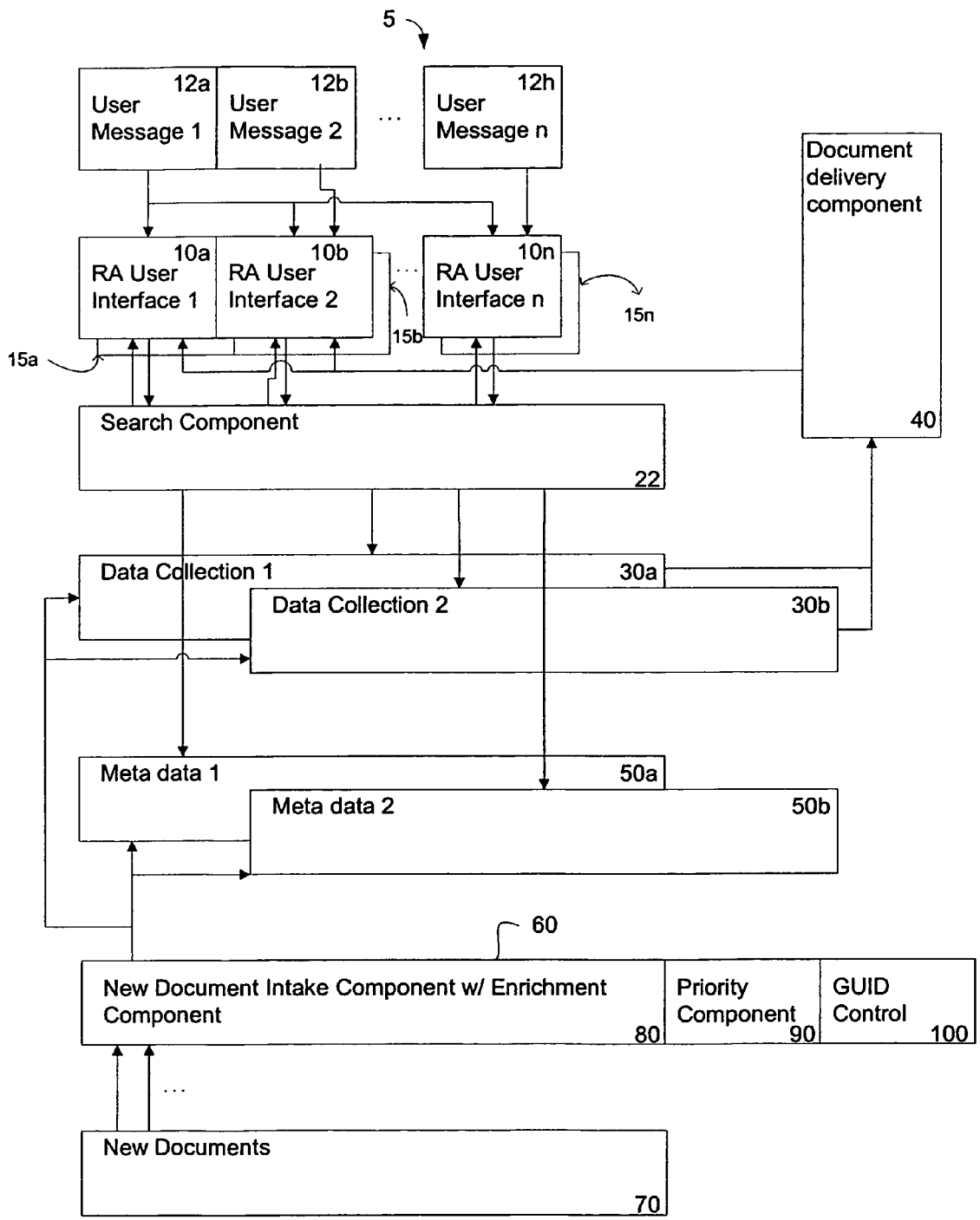
FIG. 3 is a schematic block diagram showing an overview of a system for maintaining and distributing a large aggregation of electronically stored documents.

FIG. 3 is a schematic block diagram showing an overview of a system for maintaining and distributing a large aggregation of electronically stored documents, including the functionality discussed for FIG. 2. Only higher level functional elements are depicted. These stored documents are to be made available to a diverse population of users. The elements of the system include one or more Resource Application (RA) User Interfaces 10a, 10b . . . 10n that access and/or generate and deliver various static and interactive screens for users, to elicit and accept as input one or more User Messages 12a, 12b, . . . 12n; a shared Search Component 22; one or more Databases or Data Collections 30a, 30b (for simplicity, only two are shown); a shared Document Delivery Component 40; one or more Metadata files 50a, 50b (again, for simplicity, only two are shown); and an Intake Component 60 for processing documents from a New Documents queue 70, with an Enrichment Component 80, a Priority Component 90 and a GUID Control 100.

Each RA User Interface 10a, 10b . . . 10n is part of a resource application 15a, 15b, . . . 15n, a collection of software that serves as an information access resource in one or more subject matter areas. A resource application embodies a particular desired commercial offering (i.e., "product") and/or responds to a particular user need or user profile. As such, one resource application may distinguish itself from another by: content/subject matter accessible; degree of document enrichment, user interface features; document delivery formats or modes; pricing; and other features appealing to a particular resource need or user market.

The various components of the present invention provide a set of tools that allow essentially seamless content sharing of stored documents across different resource applications, as well as allowing access in a variety of ways (e.g., via web sites, intranets, extranets, wirelessly, and others). The present invention also includes implementation by means of a common resource application infrastructure for providing shared system services and tools to resource applications (AR Server 300, FIG. 4). For information retailing, security and billing services are significant shared services. Each resource application is developed to serve certain user profiles and marketplaces by facilitating access to at least a portion of the documents stored and maintained by the common content repository and data server software (CCRDS Server 400, FIG. 4). The benefits of defining and implementing for resource applications a set of shared services and tools such as those discussed below include: reusability, reduced time to develop applications, and reduced costs for new application development.

In one system applicable to the present invention, a large aggregation of data is stored in a common content repository managed by CCRDS Server 400, although it may be spread over a plurality of accessible servers and maintained redundantly. The data covers a wide range of subject matters and may be accessed by diverse groups of users for different reasons. As such, it may be useful to offer different types of user access to the data through different user interfaces 10a, 10b, . . . 10c. Each user interface may be implemented in screens adapted to serve certain specific user characteristics and needs. The user interface can not only be customized to provide ease of formulation of user messages that make inquiries or request documents, but also customized to provide user-appropriate forms and formats for document delivery, i.e., the data delivered from the common repository may be tailored and formatted specifically to the particular user interface.

For a variety of reasons, the information stored is stored in the form of individual documents within an aggregation of documents. The aggregation of documents may be partitioned into one or more collections of documents. As used herein, a document is broadly defined as one coherent data unit that receives a unique universal identifier (GUID), such as a news article, a judicial opinion (case report), a regulatory ruling, a report, an electronic file or database record, or other customary format (in either paper or electronic media) in which an author or source prepares information. A group of related documents may be stored together (logically, not necessarily physically) as a collection, and one or more collections may be stored together (again, logically, not necessarily physically) as a set. A given document generally appears only in one collection.

The use of collections and sets may facilitate a user's range of searching by allowing a user to specify (or the system to select) a search within a particular, commonly-understood set or collection, e.g., a particular set of regional legal case reporters; a particular category of periodicals, such as law reviews; a collection of records, such as death, property or trademark records. Each document is indexed at least once within a collection and set. This collection and set arrangement also allows the system to reduce the search burden by directing the search to particular collections or sets and not requiring each search to cover the entire document repository. A document repository may be extremely large, containing 20 Terabytes or more of information in total.

In some fields new documents are generated constantly, sometimes even with such high frequency that they appear or are generated every few minutes or seconds and are delivered to document queue 70 in real time by FTP or other format. As the data repository is updated or its collections expanded, new documents may be added to the one or more data collections

30a, 30b. Because the new documents will later be accessed by different users for different purposes, it is desirable that the document intake functions performed by the Intake Component 80 provide a proper foundation. It would be undesirable to have to repeat intake of a given document or, except in unusual circumstances, to edit its content after it has been added to the repository. Yet, this same document may need to be modifiable as part of its delivery, based on the user interface and resource application that may be employed to access the document. (Moreover, the resource application may not exist at the time the document enters a document collection.) Thus, each document is preferably stored in XML or another document format that permits flexibility in later publication and is provided at the time of creation or entry with attributes that aid flexibility. Furthermore, a metadata file entry or record associated with the document may also be created. This metadata file entry or record allows the content of the document to be enriched in certain ways that may be appropriate for the document itself at the time of intake and also permits later enhancement of the information available to a user, by modifying the metadata associated with a document at intake without modifying the document itself. (As used herein, metadata means information about information and could be any information about a document that is useful either to a user, the system, or both.)

Figure 6:
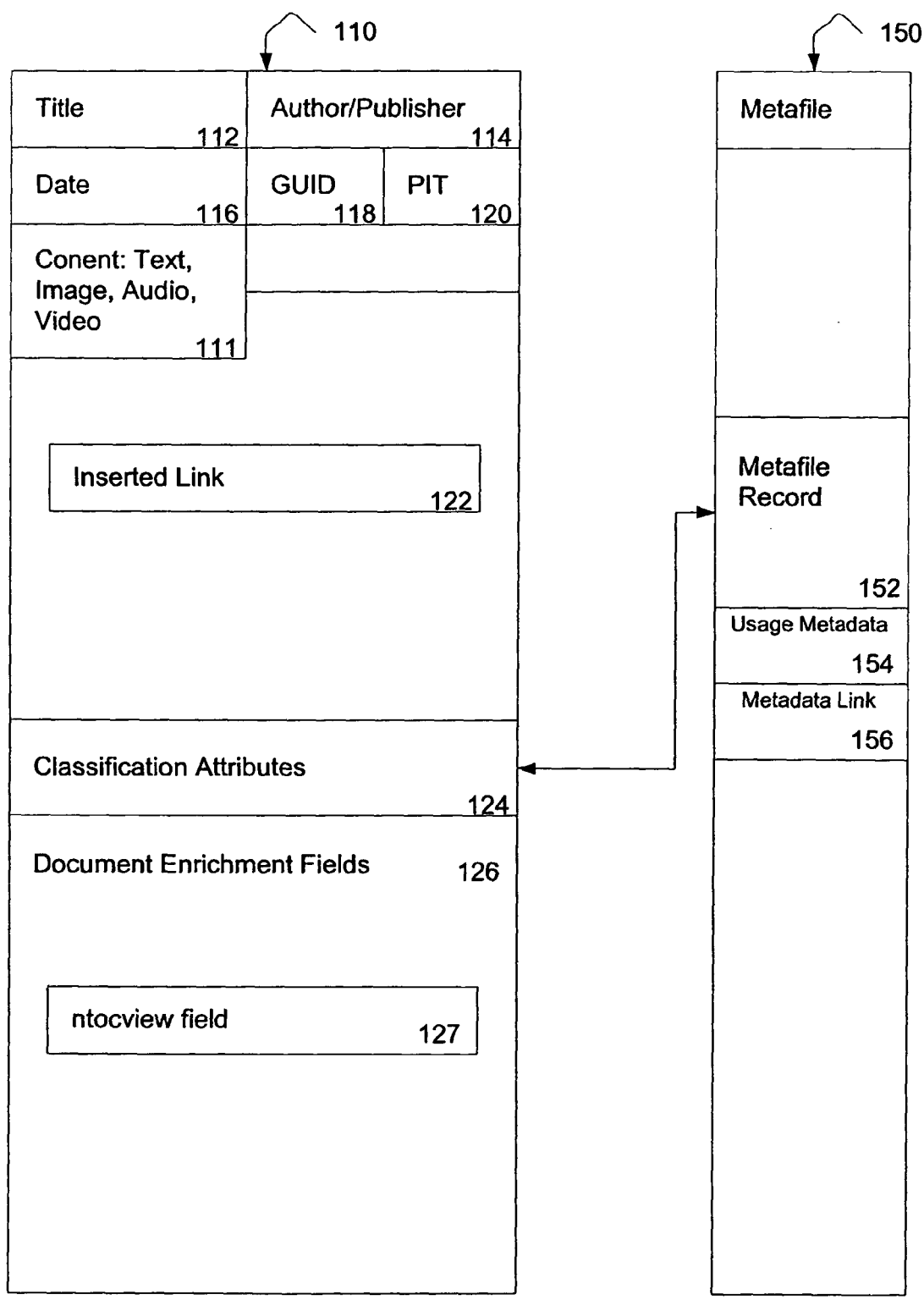
FIG. 6 is a schematic diagram of a document record and related metadata record as used in the present invention.

FIG. 6 shows a schematic diagram of a document record 110 such as might be stored in a data collection 30a, 30b and a metadata file 150 in which a metadata record 152 associated with the document 110 is stored. The document record 110 includes such fields as title 112, author/publisher 114, date 116, GUID (global universal identifier) 118, and PIT (point in time) stamp. The document can include fields 126 for receiving enrichment data prepared at intake and can include an optional "ntocview" field 127 that relates the document to one or more Tables of Content (as discussed further below). The document may contain one or more inserted links 122 or classification attributes 124. A document may contain text, still or moving images, sound or other forms of content. The nature of the content can be another attribute 111 captured either in the document record 110 or in a metadata file record 152.

As stated, a document processed by the Intake Component 80 may be enriched by providing the file as received from a source (e.g., a news publisher, a journal publisher, a stock market, a court or regulatory agency) with attributes. The particular attributes provided will depend upon the type of document being added. The attributes may be specified as part of the metadata files. They may also be specified as part of a particular resource application.

The attributes may serve at least two functions. The first is utilitarian within the system or to the user. That is, specific content or content modifiers, as well as functional features (e.g., showing navigation relationships to other documents or links that actively establish navigation connections) can be created. The second is brand recognition features, because the perception of a source is often as important as the document itself. This brand identity can be established by the finished look of a document, which can be facilitated by certain brand identity attributes added to the document, such as unique format or special derived, value-added content produced from the content as delivered from a source.

For example, a document processed for intake may relate to a given stock report or company analysis. The text or factual content of the document is generally static once it is created. Two different vendors, each having a perceived level of quality, may offer users access to the content of that document. Thus each vendor will make that document accessible, but may want it to have the "look and feel" of their own information retailing system. Thus, the attributes and/or the metadata files of the present system may be utilized to supplement or enrich the document as it is provided from its source so that it may be perceived as a more unique and branded and value-added product when presented via a specific user interface or resource application.

One of the attributes that may be associated with a document for its enrichment at intake includes linking the document (e.g., by insertion of a hyperlink 122) for later possible use on a resource application-dependent basis. For example, a case report suited to a legal resource application might include links to other, internally-referenced case reports that may be found in the common content repository (or elsewhere, such as the Worldwide Web). A news article may be linked to specific content relevant to the persons or events identified within the story. Accessibility of such links 122 may be contingent, i.e., depending on the resource application, not be provided out through a user interface in some contexts. For example, a non-legal user of a news service may access a legal case report. The links to other case reports may not be active or suitable for this user in the same way they would for a legal professional user. As noted, the metadata file record 152 associated with a document is another location for attributes added to a document at the time it is added to the repository. The metadata record 152 stores information (or links 156 to other metadata files) that may be used by a resource application to overlay, add, delete, or modify data, parameters, or display formats for a document in connection with a user inquiry message, without changing the original stored document record 110 itself.

As part of the process of document intake, a document record 110 can be enriched with editorial material. That is, value added editorial content may inserted in a document or associated with or attached to the document by addition to a metadata record. For example, with a legal case report, headnotes or a summary can be created and added. This material can be created manually or in some cases automatically. For example, cases referred to in a legal case report can be cite checked and cites updated automatically. Additionally, new documents can be labeled by a variety of classification attributes 124 that may be used as indicia for some collective grouping, e.g., jurisdiction, topic, etc.

B. User Inquiry Process Overview

Information retailing can be done with a variety of customer relationships. However, in most instances, there will be some kind of customer contract that defines the subscription or terms of access that the customer has purchased. This contract may specify limits on the subject matter that can be accessed, hours of access, etc., and define pricing. Contracts may be entered into on paper or on-line and well in advance of any use of the information repository. With appropriate payment secured, contracts could also be entered into immediately prior to use. Once the contractual relationship between the information provider and the user is defined, the user will have access to at least a portion of the common content repository via one or more resource applications and their user interface(s).

One purpose of the invention is to permit the information provider to define essentially any information product/service and customer relationship that is desired for access to portions of the common content repository and delivery of documents. The relationships may thus involve a number of parameters that can vary from customer to customer, including: collections or sets to which access is permitted; access hours, number of users or other loading limits on access availability; the look or content of the screens presented to the user, by which the user enters inquiries or requests and receives results; the modes and/or formats of delivery of documents that may be requested; and the fees for various forms of usage. Thus, the retailer may desire to develop resource applications that support a variety of relationships, to permit the system to provide services conforming to the various business terms agreed.

An overview of how a resource application provides access to the common content repository is useful. Initially, an end user seeks a document from the system in an end user inquiry. As shown in FIG. 3, this request is in the form of a User Message 12a, 12b, ... 12n. Multiple User Messages can be entered from simultaneous users, at any hour of the day, from anywhere in the world (unless limited by the defined customer relationship). A User Message may conform to a number of different formats, such as a Find, Search or Browse operation. For example, if a user knows specific information, such as the title and author of a document, the user would ask the system to Find the specific document. On the other hand, if the user were looking for general information on a subject, the user would perform a Search or Browse to find any relevant information or refine an inquiry. These are only examples of the multiple types of User Messages that may be defined within a resource application and received by the system from the user.

Each User Message is entered into the system by a user through use of one or more RA User Interfaces 10a, 10b, ... 10n. Each User Interface may have a unique look and feel and facilitate the users' retrieval of specific kinds of documents, depending on the type of User Interface being used. For example, the User Interface of a resource application designed for retrieving legal documents will be adapted to access different documents than a User Interface designed for retrieving newspaper articles. These User Interfaces of different applications will likely have a different look and feel, because they are designed to access different types of documents and appeal to a different user profile.

After a request has been entered as a User Message 12a, 12b, ... 12n by a user, a Search Component 22 is used to find relevant documents. The Search Component uses key words or phrases from the user's request to determine where relevant documents are located and to deliver a search result message identifying one or more documents. The Search Component ultimately finds the GUID identifier for each document, which will allow the document to be readily pulled from a collection. In some situations the Search component delivers a list of "hits" rather than actual documents and a further User Message defines the selection of a particular document for viewing or other delivery. The Search Component is described in further detail below.

Each document that is stored in the one or more data collections 30a, 30b is stored with a precision point in time (PIT) 120, from a timestamp component of the GUID Control component. This PIT field may be an actual clock time value, but may also be a sequence or version identifier that simply shows for a given document where a particular version stands relative to other versions. For example, version identifiers can be built on GUID's: GUID.00, GUID.01, GUID.02, etc. (This can be particularly useful for legislative documents.) Thus, if documents or related data are modified over time (e.g., by adding or changing the associated metadata), the PIT can help the system detect whether the most current version of a document and associated data is presented to the user. It also allows an updated version of a document to be presented if the search function comes across that document, despite an earlier version of the document having been previously presented. In addition to an intake time PIT, a resource application can track a time of delivery that may be useful for this latter updating function.

Once a document has been requested from a database, a Document Delivery Component 40 may be used to deliver the document to the user. The Delivery Component 40 presents the document in a format and in a mode (e.g., e-mail, fax, courier) selected by the user from those made available by the resource application. The same document, therefore, may when delivered have a different look and delivery mode depending on which User Interface and resource application received the request for it.

As shown in FIG. 3, the documents stored in the databases or data collections 30a, 30b are associated with metadata files 50a, 50b. Metadata files may include a variety of additional information associated with each document. This information is not part of the document content itself, but may be accessed during a search for relevant documents or at the same time as the document itself is accessed for delivery.

Each New Document is initially placed into a Database 30a, 30b by an Intake Component 60. The Databases are updated with documents on a constant and frequent basis and at least some of the documents require immediate publication. For example, stock price reports and hot news articles should be made available as soon as possible; their relevance is often short-lived and their value is associated with their timeliness. The Intake Component's Priority Component 90 prioritizes incoming documents for processing, using one or more priority levels to selectively process out of the time order of receipt documents with real time or other special availability requirements that may be defined for a particular resource application, (e.g., a resource application that promises hour-of-publication availability of case reports or news items). The GUID Control component 100 may check the uniqueness of the assigned document identifier for each document before it is made available to any user in a Data Collection. The Intake Component 60 may also check the document for a predetermined format before making the document available to a user. These features help ensure that documents released to the Data Collections 30a, 30b are ready to be accessed by the system.

Intake Processing

Figure 8:
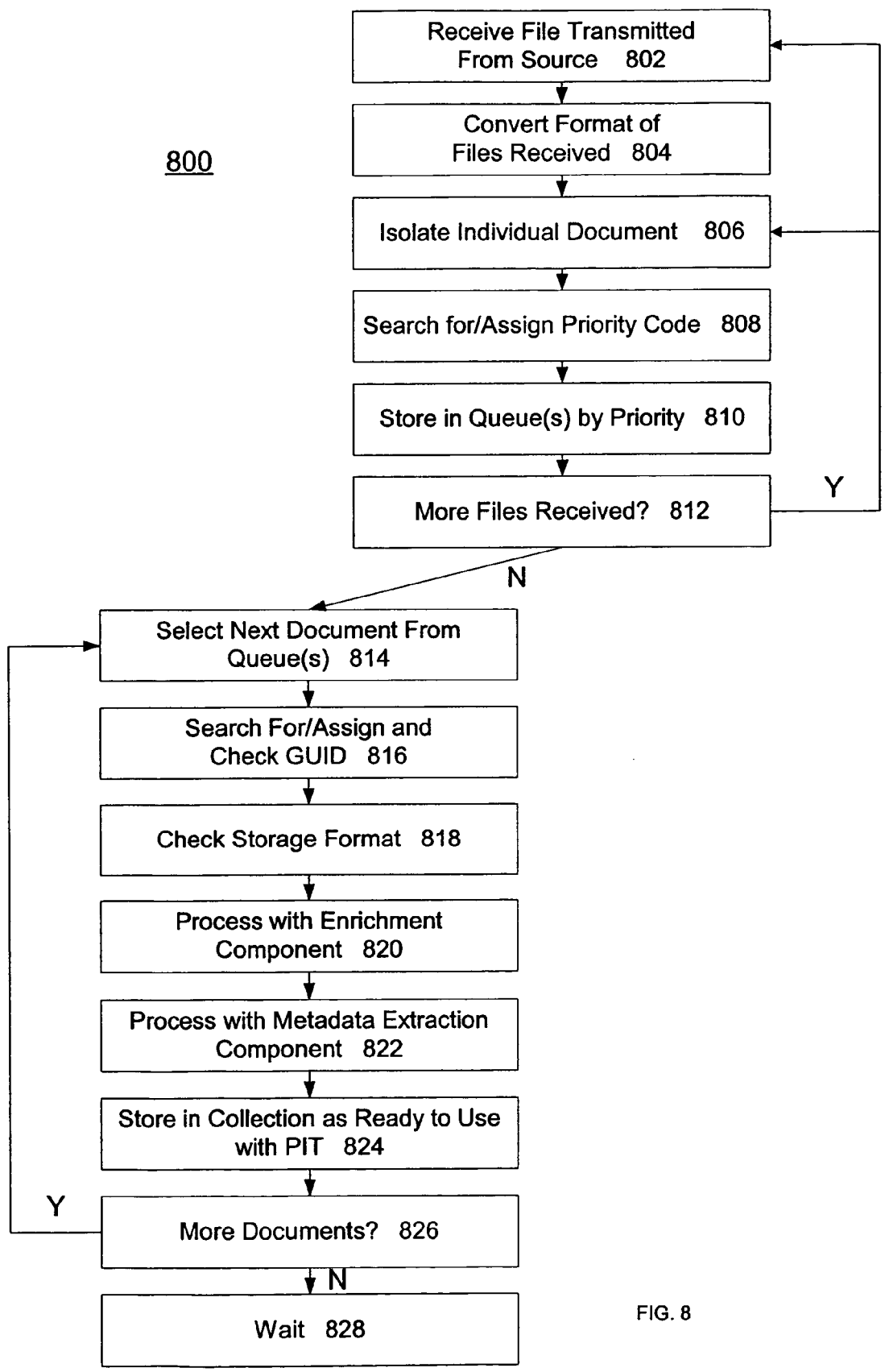
FIG. 8 is a flowchart diagram showing the process for document intake.

FIG. 8 shows in flowchart form the intake process 800. At 802 the system 5 (FIG. 3) receives a file transmitted from a source, such as a news service, a court, a market data service, and at 804 the Intake Component 60 converts the files from a transmission format to a more suitable format for intake processing. At 806 an individual document is isolated for processing and at 808 the Intake Component searches for a priority code that may have been pre-assigned by the source or that now may need to be assigned. At 810 the document is stored in one or more queues for further processing by priority. At 812 the system checks for additional documents in a file and/or additional files received and, if either is present, returns to the appropriate execution point to process the next document or file.

At 814 another processing resource accesses the queues of documents by selecting the document with highest priority. At 816 the Intake Component searches for a GUID that may have been pre-assigned by the source (in coordination with the system, which must ensure uniqueness of GUID's) or that now may need to be assigned based on history and algorithms that ensure uniqueness. At 818 the document's storage format is checked to ensure its readiness for processing with Enrichment Component 80 at 820.

The Enrichment Component may be used to enhance each document as it is placed in a document Collection 30a, 30b.

The Enrichment Component adds various features to each document that increase the value of the document for one or more user groups. The Enrichment Component associates each document with one or more of the following: additional editorial material prepared by a human agent; additional editorial material prepared by an automated agent; a link providing a pointer to another document in the database; or an entry associated with the document appearing in a metadata file. These enrichment features allow the end user to receive a value added product in the form of an individual document combined with additional content of some sort. Different forms of enrichment may be available depending on the resource application 15 used to serve a particular user and deliver a particular document.

Following enrichment processing at 820, the document may be subject to metadata extraction component processing at 822. Metadata developed in this processing generally involves extracting data that is important for connecting this document into one or more collections. Thus, the content of the document may be analyzed to develop linguistically intelligent categorization of this document relative to other documents in the same or different collections. Various forms of metadata may be developed that assist in storing or retrieving, and in modifying or customizing a document to provide a basis for features of one or more resource applications.

Referring still to FIG. 8, after metadata is extracted, at 824 a document is stored with a PIT corresponding to its time of release for access. At 826, the system determines if there are more documents in the priority queues to be processed. If not, the document processor goes into a wait state at 828. If there are more documents, then control passes to the execution point at which the next document is selected from the priority queues.

The documents in at least one data collection in which a new document is placed may be partitioned into at least one collection subset and the intake component for receiving new documents may ensure that each additional document has a unique identifier and is assigned to at least one collection subset. Another data collection may have at least one document set that is an aggregation of the documents in one or more collection subsets.

Enrichment and Metadata Processing

Figure 9:
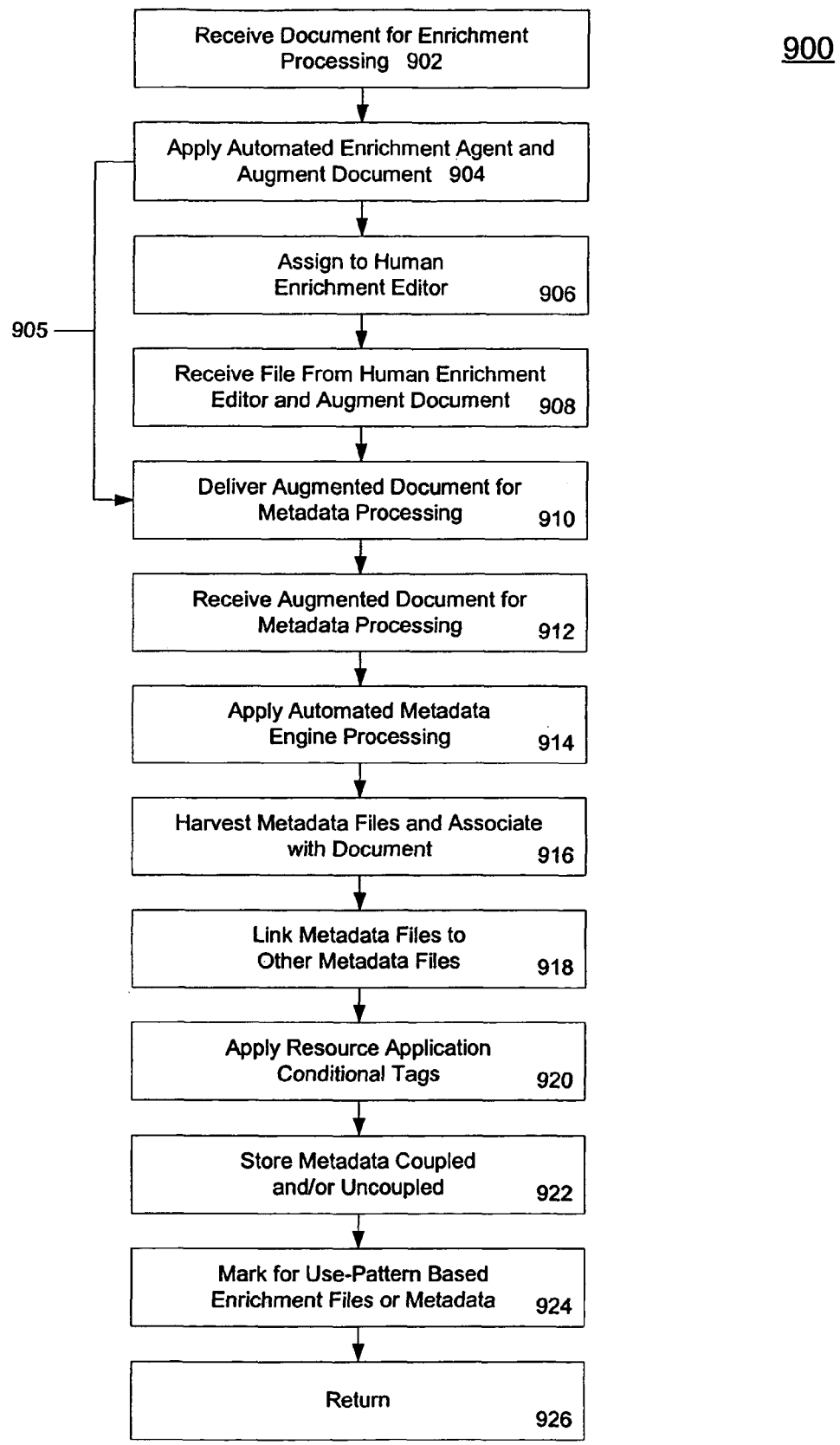
FIG. 9 is a flowchart diagram showing the process for enrichment and metadata processing of a document.

FIG. 9 shows a flowchart for the process 900 of document enrichment and metadata extraction as referenced in FIG. 8. At 902 the components used for document enrichment processing receive control and receive a document for enrichment. At 904 an automated enrichment agent is applied and the enrichment features produced by the agent are used to augment the document. For example, the agent might search for individual or company names in a news article or a case and then build a file for sidebar display that could be consulted by a person browsing the document. Following application of the automated enrichment agent, a bypass path 905 to step 910 may be taken when assignment to a human enrichment editor is not needed. If the bypass 905 is not taken, at 906, the document is assigned to a human enrichment editor for review and editing. At 908, the human enrichment editor returns a file with a further augmented document. At 910, the augmented document is delivered for metadata processing and at 912, the metadata extraction component receives the delivered document. At 914, an automated metadata engine is applied to the document to extract metadata and at 916, the metadata files are harvested and associated with the document. For example, the metadata extracted may develop into a layer of metadata in the form of Resource Description Framework (RDF) statements built on a layer of XML data or metadata. At 918, the metadata files for this document are linked to metadata files for other documents. For example, if metadata processing has resulted in some linguistic categorization of the document, a table, index, table of contents or other collection-wide metadata file may be updated with information from and/or a reference to this document. At 920, resource application conditional tags may be added to a metadata file. These are used by particular resource applications to tag metadata for inclusion or exclusion in the document resource services offered by the particular resource applications. In some instances metadata will be excluded from searching or display, based on the presence or absence of tags that are accessible by resource applications.

At 922 metadata files are stored. These may be stored coupled to a document or uncoupled; that is, there may be a physical storage association or just a logical association. At 924, the system marks the file (or portions) as a candidate or not a candidate for addition of future metadata that may be derived by use of statistical or heuristic rule analysis of document use patterns over time. With the storing of the metadata, the document being processed becomes ready for user access, although related metadata may later change. If the system has agents for tracking and analyzing usage patterns, this marking can ensure that the use of this document is tracked when appropriate, and the results (e.g., usage metadata 154 in FIG. 6) recorded. Moreover, as usage pattern information is developed, the metadata that has been stored at the time of document intake may be updated. For example, if this document is frequently part of an observed search pattern, the metadata file may come to reflect other documents proximate in a chain of searching that has occurred, to help lead later users along that same chain. At 926 the enrichment and metadata extraction components return control to the system.

Metadata is the value-added information that is created to arrange, describe, track and otherwise enhance access to information objects. As explained in greater detail below, in the present invention metadata is developed in the form of tables of contents, derivations of tables of contents obtained by filtering or other manipulations, usage pattern data derived from user trail information, document signatures developed for duplicate detection, and token indexing among other methods. In large aggregations of documents, metadata may be hierarchical, in that higher level metadata may be developed to help make sense of lower level metadata. In other circumstances, metadata will be non-hierarchical but nonetheless related to other metadata by links or other non-hierarchical means of pointing. Tables of contents, described next, present a prime opportunity for developing value-added metadata.

Table of Contents (TOC) Building

One form of metadata processing is Table of Contents (TOC) building. As implemented in the present invention, a TOC requires that two different collection types are defined. TOC collections contain the TOC hierarchy relationship. Document (DOC) collections contain documents. A TOC can reference documents in one, two or many DOC collections. Persistent GUIDs are a requirement to achieve the benefits of the present TOC design. Where a system offers users multiple types of information, it will typically have at least one TOC for each type of information.

Figure 10:
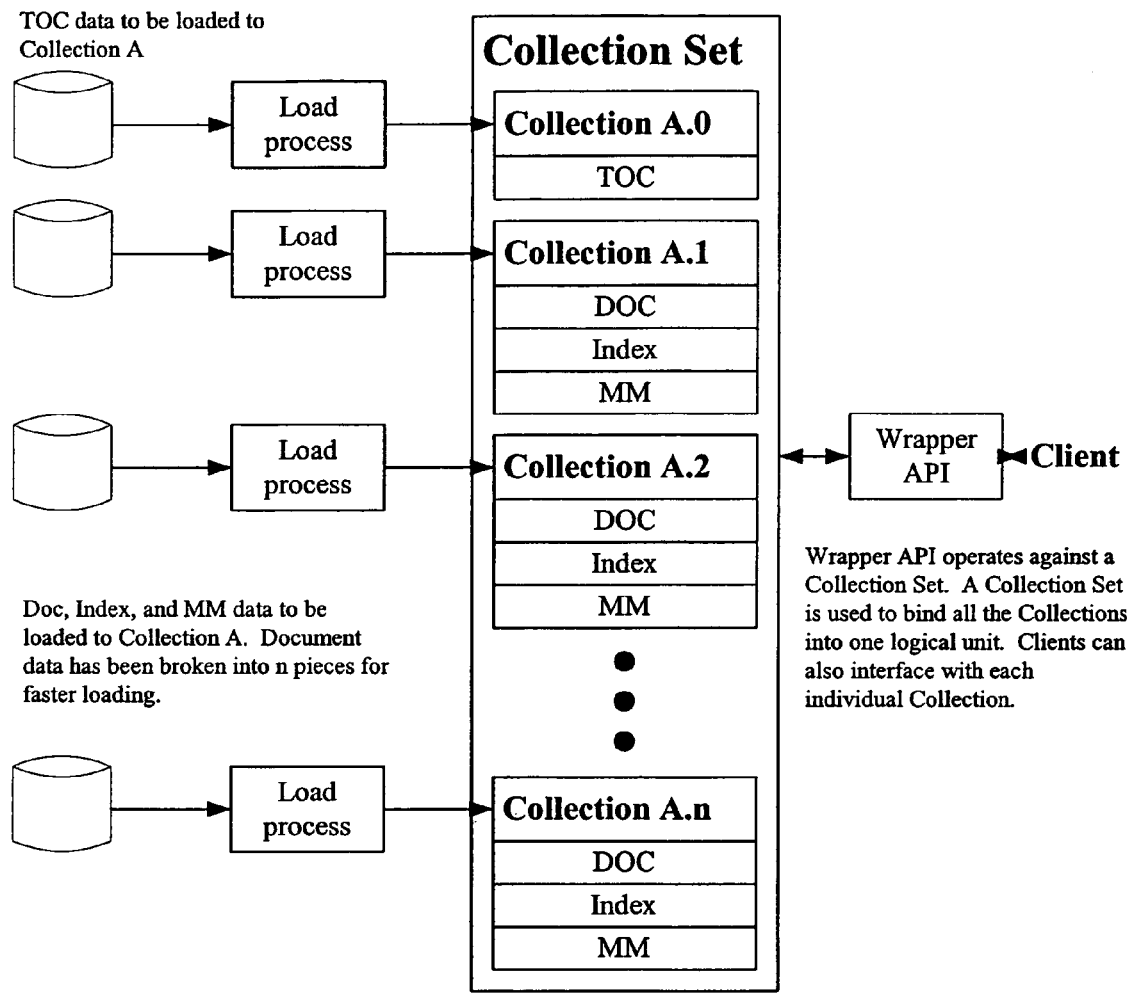
FIG. 10 is a schematic diagram showing table of Contents (TOC) architecture for the present invention.
Figure 11A:
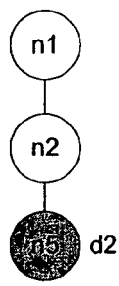
FIGS. 11A-D are schematic diagrams showing table of contents structures built in accordance with the present invention.

The TOC hierarchy resides in one collection in the common content repository and contains references to documents. Referenced documents exist in one or more DOC Collections. Collection Sets are used to bind a single TOC Collection with the DOC Collection(s) that contain the referenced documents. FIG. 10 is schematic overview of the TOC architecture. The following are further details on the implementation of TOC.

a. Loading Data. TOC data is loaded to the TOC collection. DOC data is loaded to the DOC collection(s). Both TOC and DOC collections could simultaneously be loading data. To keep the TOC and document data in sync, a synchronous promote is available to allow a client to promote multiple collections synchronously.

b. Restricting a Search Based on TOC Node. A "n-tocview" element may be added to document data loads to support TOC search-query-view restrictions. The "n-tocview" element 127 (FIG. 6) contains the TOC GUIDs that a client wishes to associate with a document. Following is an example of the XML used to update the simplified, sample TOC structure in FIG. 11A, in which the shaded node represents a TOC node that points to document "d2".

```
<n-document guid="d2" control="ADD">
    <n-tocview>n1 n2 n5</n-tocview>
    <n-docbody>document data</n-docbody>
</n-document>
<n-node guid="n1" control="ADD">
    <n-label>label information</n-label>
</n-node>
<n-node guid="n2" control="ADD">
<n-parent-guid>n1</n-parent-guid>
    <n-label>label information</n-label>
    <n-rank>1</n-rank>
</n-node>
<n-node guid="n5" control="ADD">
<n-parent-guid>n2</n-parent-guid>
<n-doc-guid>d2</n-doc-guid>
<n-label>label information</n-label>
    <n-rank>2</n-rank>
</n-node>
```

Note:
the GUIDs specified in the n-tocview are not verified by the common content repository to exist or be related information within a collection c. Wrapper API. Collection Sets are used to bind the TOC Collection with the DOC Collection(s) that contain the referenced documents. The Wrapper API contains TOC APIs to use with Collections or Collections Sets. A Collection Set provides a single point that the Wrapper API can be used against.

d. TOC XML. TOC nodes will be created, updated, and deleted by an n-node element. Each n-node element contains information that describes a TOC node. TOC data is not token-indexed (as with documents), therefore is not searchable by the common content repository. The n-tocview information may be placed within the document and therefore can be indexed for searching.

An n-node has two attributes:
guid—the TOC node GUID
control—indicates the action that is to occur.

| (i)Value | (ii)Description of action |
|---|---|
| "ADD" | Adds a TOC node to this stage |
| "DEL" | Deletes a TOC node from this stage |
| "DELBRANCH" | Deletes the TOC node and all the TOC node's children for this stage. |

An n-node has the following elements:
n-parent-guid—parent GUID of the node. A root node will not contain this element.
n-doc-guid—GUID of a document if this TOC node references a document. A TOC node may have zero or one document associated with it. Any content in this element indicates that the TOC node references a document.
n-anchor-guid—GUID of an anchor if this TOC references an anchor.
n-label—Text field with a size limit of 598 bytes.
n-rank—Real number used to sort TOC nodes for the application to display in rank order.
n-name—Content specific to the TOC node passed back to the application. This data has no meaning to the TOC definition within the common content repository. The maximum value for n-name is 20 bytes
n-value—Content specific to the TOC node that is passed back to the application with an n-name value(s). This data has no meaning to the TOC definition within the common content repository. The maximum value for n-value is 200 bytes.
n-meta-data—Contains metadata information about the TOC.

e. TOC DTD

Figure 11B:
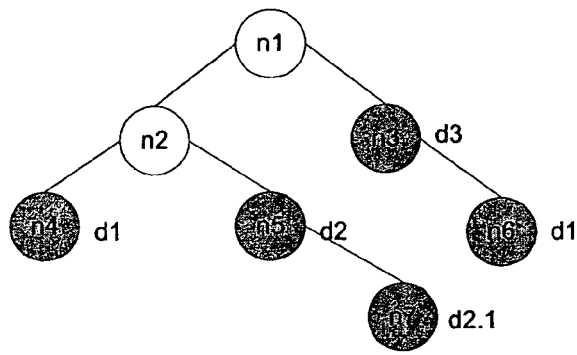

```
<!ELEMENT n-node (n-parent-guid?, n-doc-guid?, n-anchor-guid?,
n-label?, n-rank?, n-name?, n-value?, n-meta-data?)>
<!ATTLIST    n-node guid ID    #REQUIRED
                    control   (ADD | DEL | DELBRANCH)
"ADD">
<!ELEMENT    n-label           %n-labelcontent;>
<!ELEMENT    n-parent-guid     #PCDATA>
<!ELEMENT    n-doc-guid        #PCDATA>
<!ELEMENT    n-anchor-guid     #PCDATA>
<!ELEMENT    n-rank            #PCDATA>
<!ELEMENT    n-name            #PCDATA>
<!ELEMENT    n-value           #PCDATA>
<!ELEMENT    n-meta-data       #PCDATA>
``` f. TOC and Document XML Example Referring now to FIG. 11B, the shaded nodes represent TOC nodes that reference documents. Two TOC nodes reference document "d1". TOC node "n7" is an anchor of "n5".

| TOC XML | Document XML |
|---|---|
| `<n-node guid="n1" control="ADD">` | `<n-document guid='d1' control='add'>` |
| `<n-label>label information</n-label` | `<n-tocview>n1 n2 n4</n-tocview>` |
| `</n-node>` | `<n-tocview>n1 n3 n6</n-tocview>` |
| `<n-node guid="n2" control="ADD">` | `<n-docbody>document text</n-docbody>` |
| `<n-parent-guid>n1</n-parent-guid>` | `</n-document>` |
| `<n-label>label information</n-label>` | `<n-document guid='d2' control='add'>` |
| `<n-rank>1</n-rank>` | `<n-tocview>n1 n2 n5</n-tocview>` |
| `</n-node>` | `<n-docbody>document text` |
| `<n-node guid="n4" control="ADD">` | `<anchor>d2.1</anchor>anchor info` |
| `<n-parent-guid>n2</n-parent-guid>` | `</n-docbody>` |
| `<n-doc-guid>d1</n-doc-guid>` | `</n-document>` |
| `<n-label>label information</n-label>` | `<n-document guid='d3' control='add'>` |
| `<n-rank>1</n-rank>` | `<n-tocview>n1 n3 </n-tocview>` |
| `</n-node>` | `<n-docbody>document text</n-docbody>` |

| TOC XML | Document XML |
|---|---|
| ```<br><n-node guid="n5" control="ADD"><br>    <n-parent-guid>n2</n-parent-guid><br>    <n-doc-guid>d2</n-doc-guid><br>    <n-label>label information</n-label><br>    <n-rank>2</n-rank><br></n-node><br><n-node guid="n3" control="ADD"><br>    <n-parent-guid>n1</n-parent-guid><br>    <n-doc-guid>d3</n-doc-guid><br>    <n-label>label information</n-label><br>    <n-rank>2</n-rank><br></n-node><br><n-node guid="n6" control="ADD"><br>    <n-parent-guid>n3</n-parent-guid><br>    <n-doc-guid>d1</n-doc-guid><br>    <n-label>label information</n-label><br></n-node><br><n-node guid="n7" control="ADD"><br>    <n-parent-guid>n5</n-parent-guid><br>    <n-doc-guid>d2</n-doc-guid><br>    <n-anchor-guid>d2.1</n-anchor-guid><br>    <n-label>label information</n-label><br></n-node><br>``` | `</n-document>` |

Figure 11C:
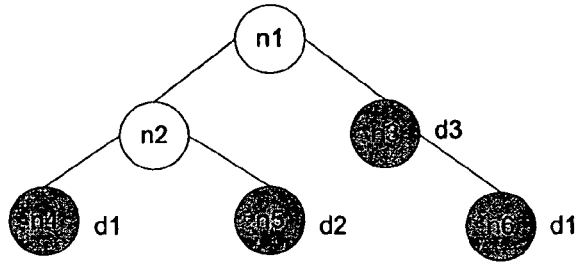

Please Note:
Document "d1" could have had a combined n-tocview of: <n-tocview>n1 n2 n4 n3 n6</n-tocview> Anchors contained within the document are specified with client specific tags. The system has no anchor-required tag within a document.

g. Updating Rules for n-nodes
1. No duplicate GUIDS. A GUID cannot be added twice or deleted and added in the same load. If this condition is not met, the load fails with data errors.
2. An n-node defined is a node replaced. If an n-node is defined in the XML, all information in the n-node needs to be redefined. The data will load successfully. The node will reflect only the latest definition.
3. An n-node without children can be deleted with the delete function. If this condition is not met, the load fails with data errors.
4. Deleting a branch implies that the n-node and all its children nodes are deleted.
5. The n-nodes of a deleted branch cannot be modified or added in the same load as the branch delete (see rule one). If this condition isn't met, the load fails with data errors.
6. An n-node's parent-guid must be an existing node. If this condition is not met, the load fails with data errors. (An existing node is a node that already exists in the TOC or one that exists in the current load. Nodes do not need to be loaded in rank order. Verification of missing nodes will occur at the end of the load process. However, better load speeds may occur if one loads nodes in a hierarchical (rank) manner.)

h. TOC Loading Use Cases—
Following are use cases showing practical implications of TOC. A majority of these examples are based on the TOC structure of FIG. 11C This same structure was used in the XML example above.
1. How can large amounts of data be loaded with the TOC structure?
Let's assume that we are going to load 50 giga-bytes of raw data and that we can load at a rate of 500 mega-bytes/hour for a given collection. If we use one TOC and three document Collections we can load this same data in little over one day. If a client is willing to break document data across multiple collections, the data can be quickly loaded.

2. How can a branch be deleted from the TOC?
Using our example, we are going to delete a TOC branch starting at node "n2", and will also delete any nodes under node "n2". Document "d2" will no longer be referenced in the TOC. The documentation will not be deleted unless a delete for "d2" is passed to the common content repository.
Here's the XML for the deleting the branch starting with "n2".

```
<n-node guid="n2" control="DELBRANCH"/> //deletes TOC nodes
"n2", "n4", "n5"
```

Here's the XML to delete the document "d2".
```
<n-document guid="d2" control="DEL"/> //deletes document "d2"
```
3. How can I change the text of document "d1"?
Reload document "d1" with the new document data and n-tocview information that allows TOC search restrictions. Here is the XML.

```
<n-document guid="d1" control="ADD">
    <n-tocview>n1 n2 n4</n-tocview>
    <n-tocview>n1 n3 n6</n-tocview>
    <n-docbody>new document data</n-docbody>
</n-document>
```

4. How can the label of TOC node "n4" be changed?
Reload TOC node "n4" with the new label information. This same example works if you are changing TOC rank, name, value, or meta-data fields. Here is the XML.

```
<n-node guid="n4" control="ADD">
    <n-parent-guid>n2</n-parent-guid>
    <n-doc-guid>d1</n-doc-guid>
    <n-label>new label information</n-label>
    <n-rank>1</n-rank>
</n-node>
```

5. How can document "d3" be deleted and leave node "n3" in TOC?

Send a delete for document "d3" and redefine the TOC node "n3" to not include a reference to document "d3". Here is the XML.

```
<n-document guid="d3" control="DEL"/>    //deletes document "d3"
<n-node guid="n3" control="ADD">         //redefines TOC
nodes "n3"
    <n-parent-guid>n1</n-parent-guid>
    <n-label>label information</n-label>
    <n-rank>2</n-rank>
</n-node>
```

6. How can document "d1" be deleted and remove all TOC nodes that reference it?

Send a delete for document "d1" and a delete for nodes "n4" and "n6". Here is the XML.

```
<n-document guid="d1" control="DEL"/> //deletes document "d1"
<n-node guid="n4" control="DEL"/>     //deletes node "n4"
<n-node guid="n6" control="DEL"/>     //deletes node "n6"
```

7. How can I insert a new TOC node "n7" between TOC nodes "n1" and "n3"?

Figure 11D:
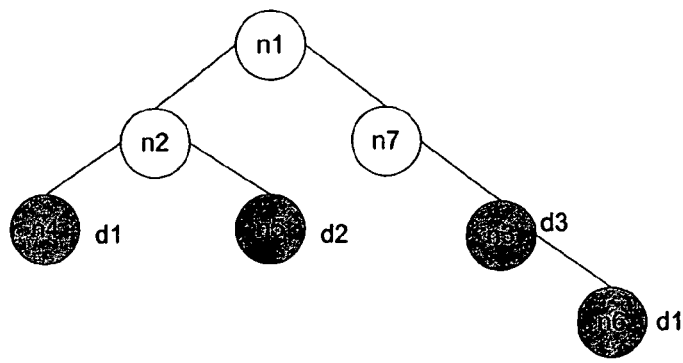

The new TOC structure would be like FIG. 11D.

Reload document "d1" and "d3" with a new n-tocview to support GUID "n7" as a query view restriction. Also create a new TOC node for "n7" and redefine TOC node "n3" to point to "n7" instead of "n1". Here is the XML.

```
<n-document guid="d1" control="ADD"> //adds document "d1"
    <n-tocview>n1 n2 n4</n-tocview>
    <n-tocview>n1 n7 n3 n6</n-tocview>
    <n-docbody>document data</n-docbody>
</n-document>
<n-document guid="d3" control="ADD"> //adds document "d3"
    <n-tocview>n1 n7 n3</n-tocview>
    <n-docbody>document data</n-docbody>
</n-document>
<n-node guid="n7" control="ADD">          //inserts toc node "n7"
    <n-parent-guid>n1</n-parent-guid>
    <n-label>label information</n-label>
    <n-rank>2</n-rank>
</n-node>
<n-node guid="n3" control="ADD">          //inserts toc node "n3"
    <n-parent-guid>n7</n-parent-guid>
    <n-doc-guid>d3</n-doc-guid>
    <n-label>label information</n-label>
    <n-rank>3</n-rank>
</n-node>
```

In summary, the TOC's provide an infrastructure for storing hierarchical metadata about documents. The TOC's are made up of nodes. GUID's identify nodes, parent nodes, referenced documents and anchors. All input for constructing a TOC is in XML. A TOC can be a recursive structure. This occurs when the n-doc-guid of a node contains the GUID of a TOC node instead of the GUID of a document. Then a TOC node references a TOC node. The vocabulary of the node labels in a TOC may be used as the vocabulary for RDF statements in metadata.

A document can exist in only one DOC collection at any point in time. However, documents can be represented in multiple places with a TOC. Documents from one or more DOC collections can be represented in one TOC.

Figure 12:
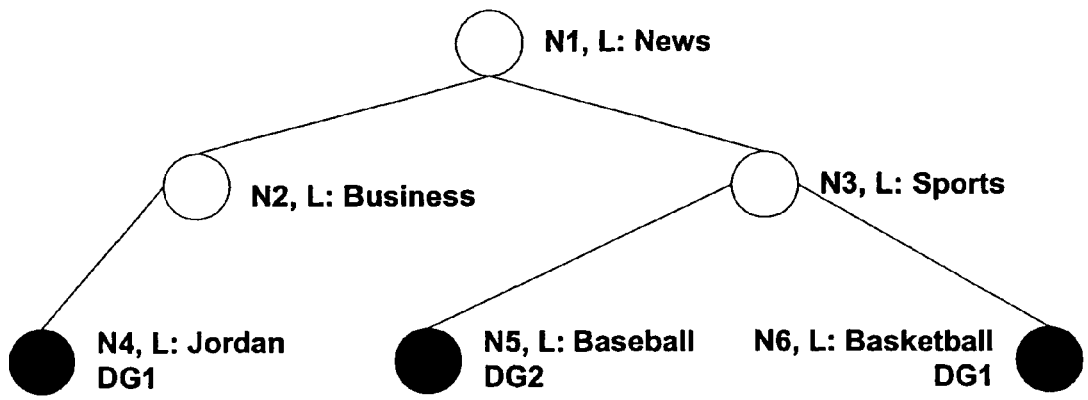
FIG. 12 is a schematic diagram showing a table of contents example built in accordance with the present invention.

TOC hierarchy data is stored in a TOC collection. Document data is stored in one or more DOC collections. A particular TOC resides in one collection. That TOC collection and the one or more DOC collections that the TOC collection references are tied together by a collection set. FIG. 12 shows a sample of a simplified TOC that references two documents (labeled DG1 and DG2).

The present TOC design affords a number of useful features:

TOC Navigation: API's are provided to navigate the nodes of a TOC. The following sample operations can be executed through such an API: retrieve root node of the TOC; given a node, retrieve its children; given a TOC search result and a TOC node, retrieve the next or a previous node in TOC order; and given a node, retrieve its parent.

TOC with Hits: when a search yields document hits, these will be merged to return the number of hits at each TOC node.

Filtered TOCs: If a resource application sends a reference to a search and a TOC node, the portions of the TOC that do not match the search will be eliminated. If a resource application sends a reference to a subscription handle (a limitation on a search, based on a subscription), any TOC that does not meet the subscription criteria will be eliminated.

Find Nodes: If a resource application sends a reference to a name and/or value, a TOC will return related nodes.

TOC Anchors: Anchors can be used to reflect a hierarchy within a document.

Indexing

As preparation for metadata processing, a document is normally indexed by creation of an index file. Such an index file is derived in the conventional manner by tokenization, stopping, stemming, elimination of capitalization and inversion. See, e.g., U.S. Pat. No. 6,389,412. The relationship of the indexing process to metadata extraction may be of interest. Because indexing results in some loss of semantic information, indexing may be undesirable for some document collections. In other collections, indexing is acceptable, but it is best to perform metadata extraction on a document that is not in indexed form, in case the information to be extracted lies in whole or in part with features lost in indexing. Metadata may or may not be indexed. In one embodiment, the TOC data is not indexed and therefore is not searchable by search engines that rely on indexing. However, it is available for a user to explore as explained in further detail below.

The documents in a data collection may be partitioned into at least one collection subset. The system may have an index service that maintains an index of keywords appearing at least once in the collection subset, with an association between the keywords in the index and the location of their appearance in the collection subset.

Component Implementation View—Overview

Figure 4:
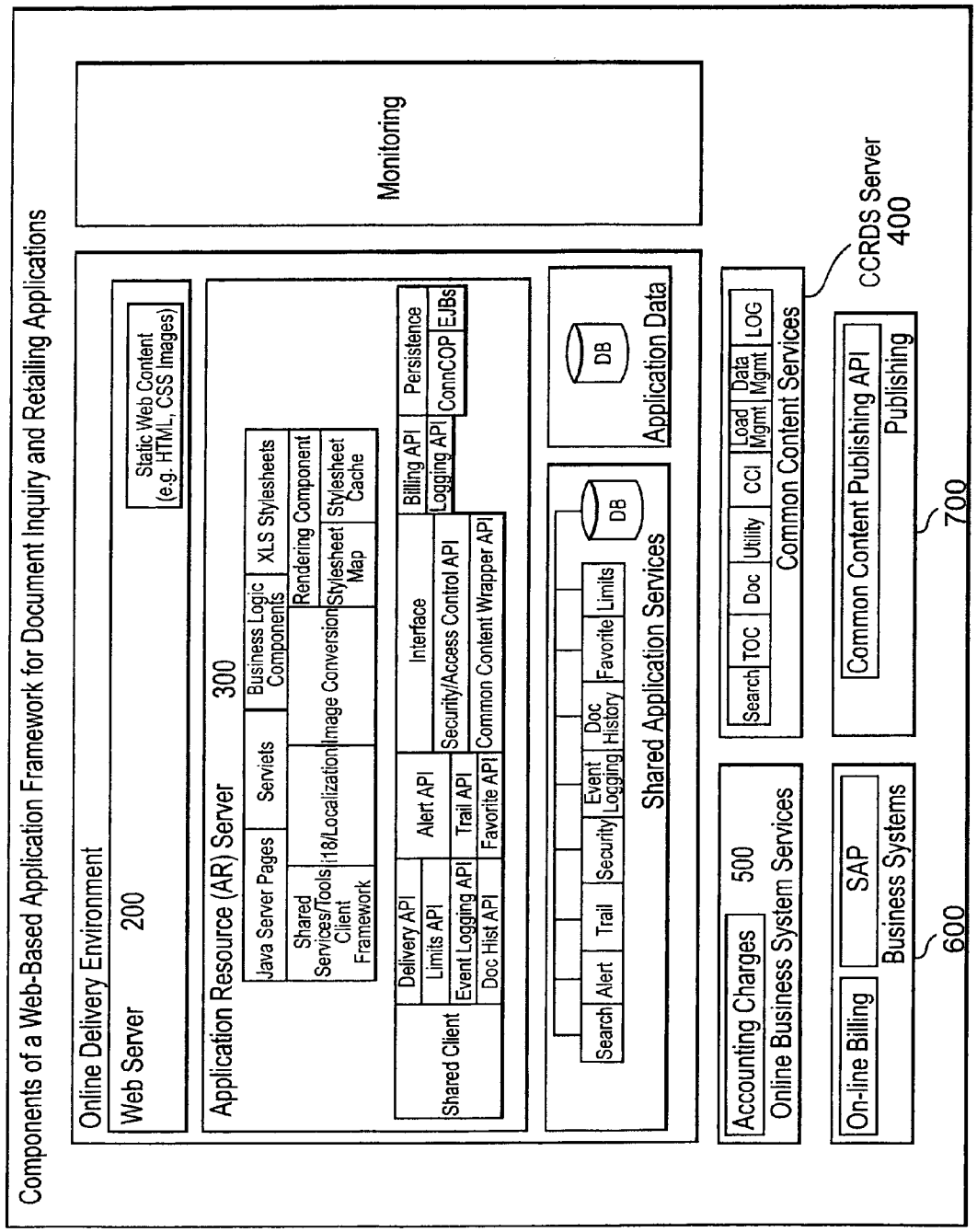
FIG. 4 is a block diagram illustrating the components of a web-based application framework for document inquiry and retailing applications and its interconnection with a common content repository software system.

FIG. 4 is a block diagram showing the main components that implement the higher-level functional elements shown or described above. The main components include Web Server 200, Application Resource (AR) Server component 300, and one or more resource applications. In a web-based system, CCRDS Server 400 and AR Server 300 act as the servers with the resource applications as the client. Specifically, CCRDS Server 400 is a database (collection) server and Web Server 200 and AR Server 300 are a web and application server, respectively. Other system components are On-line Business System Services 500 and Business Systems 600 and a Publishing API 700. Within the Business Systems 600 are On-Line Billing and SAP components.

The AR Server 300 components provide an application framework used to deploy web-based resource applications that access documents residing in the CCRDS Server 400 repository. This framework is intended to provide a quick turnaround of new resource applications to which users may subscribe, such as news services, legal services, etc. In one implementation, the AR Server components provide serializable objects that can be used across J2EE containers.

Although it is anticipated that the greatest benefits and the system's ability to provide shared customer information across the multiple resource applications occurs with maximum use of the shared AR Server components, an application does not necessarily have to utilize all the functions provided by the server architectures. Some of the other advantages of the server architecture of FIG. 4 include reusability, speed of time to market of new or updated applications, and reduced costs for new product development.

In general, the CCRDS Server 400 components provide access to a large aggregation of electronically stored, indexed, and sorted documents. These documents are added into the common content repository and enriched to allow for easier retrieval and value-added content. When a user searches or requests a document through a resource application, the CCRDS Server 400 interacts with the AR Server 300 to provide the search results or document in an efficient manner. The CCRDS Server 400 utilizes a number of tools to enrich the documents. These tools are described in more detail below.

In general, the AR Server components 300 provide an application framework used to deploy-web-based resource applications. The components implement a common services and tools framework that reduces the development time and costs for each resource application that retrieves documents using the CCRDS Server 400. Thus, new resource applications can easily and quickly be created by business units allowing a tailored interface, while providing access to a centralized core of data and services. In addition, the AR Server 300 components promote a sharing of information about a customer across various applications. In one embodiment, the framework establishes a set model for application development, such as Java 2 Enterprise Edition (J2EE) and other recommended guidelines.

The framework offers Application Program Interfaces (API) to produce generic markup language, such as HTML or XML, however, the application developer of the resource application is responsible for providing the interface, whether an XML stylesheet or Java object, that converts the generic HTML or XML to the format required by the resource application. Common services and tools are provided by AR Server components 300, thus eliminating the need for each resource application to develop these services individually. These services and tools are explained in more detail below.

Each resource application is a unique application designed to provide users in a particular market with a tailored product for locating and retrieving documents. As explained above, a resource application utilizes special services and tools provided by the AR Server 300 to access a large common content repository of documents managed by the CCRDS Server 400. More than one resource application can interact with the AR Server 300 and the CCRDS Server 400 simultaneously to access and request the same document; however, the document may be provided a unique look and feel based on the resource application used to deliver the document.

Each resource application is developed with its own interface components, such as HTML, JPEG images, Java Server Pages (JSP), Servlets, custom stylesheets, etc. However, instead of each resource application 15 (FIG. 3) utilizing custom tools and services to communicate with a user, process User Messages, access the documents stored in the common content repository, and apply all the other business rules for the information retailing transactions, the AR Server 300 and the CCRDS Server 400 have standard components that allow each resource application to utilize pre-programmed tools and services. For example, the Security component of the AR Server 300 allows each resource application to utilize the same security features, yet each can present the security features in a different format, depending on the components selected to develop the application. The various tools and services provided by the AR Server 300 and the CCRDS Server 400, and how they interact with the various resource applications are described below.

The AR Server 300 provides a common architecture/infrastructure model for building web applications across companies. The CCRDS Server 400 provides a reusable backend for searching, document delivery, and Table of Contents. The AR Server 300 provides the same reusability for the web applications.

CCRDS Server

CCRDS Server 400 is a common content repository and management system that facilitates the introduction of new documents and the retrieval of existing documents. CCRDS Server 400 includes the following utilities for inputting, enriching, finding and retrieving documents: Search Engine, Table of Contents (TOC), Doc, Utility, CCI, Load Management, Data Management, and Logging.

Search Engine

The Search Engine provides a number of tools for locating documents in different ways. For example, a Search, a Find and a Browse operation may be provided.

The Search operation enables a user to receive in response to a User Message with a proper inquiry single or multiple "hits" that satisfy the query from the common content repository. In general, the user interface will solicit the user to specify query terms and select desired content-collections and/or content-types as part of the Search operation. Users of the Search operation may have different capabilities and understandings of online-search functionality. Some users will have previous experience with proprietary search engine products and others will have experience with Internet search engines. User interfaces may be designed to look familiar to those with such experience.

One use of Search includes a search for information by Query Terms with Boolean operators. The user will enter query term(s) into a query box and have expectations that the Results list will comprise documents that contain this term(s). Here, the user wants to construct a query with terms and Boolean operators. The user will have expectations that all Boolean operators are supported, i.e., they will be recognized by the search engine, and that only documents that satisfy the conditions of the query-string will be retrieved.

Boolean language searches may be extended via the use of "fielded information." This technique allows the user to search for specific metadata and content attributes of the data to further filter the search. Typical fields include items such as, document dates of various types, authors, titles, publication, topical classifications, etc.

Searching by topic (where the topics associated with a particular document have been assigned in advance by an editorial process) is accomplished using Fielded searching extensions to Boolean searching, though this may not be exposed to the user in the same way as a more conventional search. Fields may also be extended to be quite specific to content collections, for example: parties to a case, a judge, a docket number, etc.

Another way of searching is to use Search for information using natural language. Here, the user wants to enter the query terms in natural language syntax. For example: "get cases about insurance fraud." Search results returning from Natural Language searches are expected to have relevance in relation to the terms of the search, omitting sentence construction syntax. For example, in the above search, the results returned should include the term "insurance fraud."

A compound Search function, known as Alert, may be offered, wherein the user wants to be updated when something has changed or there is new information that is relevant to their area(s) of practice. Users set up a portfolio of search Alerts that run automatically on a periodic basis. Each Alert is set to run a particular search against a particular content collection at some defined interval. Each Alert will allow for certain attributes to be defined. For searches, these attributes might include, e.g., query terms, content collection, subject areas, etc. Users should be able to define multiple Alerts as well as stop, start, delete or change the frequency for each Alert in their portfolio. Documents found by the Alert service can be delivered in the manner of a conventional clipping service.

The Find operation enables a user to retrieve a single document from the content collection. In general, the user should not be required to specify particular fields, categories or areas, such as, a jurisdiction or practice area as part of the Find operation. The users of the Find operation have pre-existing knowledge that a document exists and wish to access that specific document. Such users will have identifying information specific to that document such as, e.g., a cite, a title, the parties involved, or a common name for the document.

Certain references may not be sufficient to describe a particular document. Examples of this type of problem occur with multiple texts of the same document, the same document in different languages, or differing sources for a particular citation abbreviation. For example, the abbreviation "ALR" is insufficient to distinguish between the American or Australian Legal Report publications. In such cases, the find operation will retrieve all versions of a particular document that fit the reference and allow the user to select the particular document of interest.

The Find operation is different than Search or Browse. Find allows the user to access a single specific document. Search allows users to scan a collection for documents that fit a set of criteria that they define. Browse users sift through the taxonomy for documents that may fit their needs.

Also included with the Find command is a Find by Attributes operation that enables the user to retrieve a document by specifying one or more attributes of the document or its metadata. Examples of Find by Attribute include: Find by Title, Find by Parties (look up by participating parties), and Find by Common Name.

Depending on the application, there will be occasions when it is appropriate to set up pre-filters before running a Find operation. Such filters would allow the user to limit the results by, e.g., Country code, Language, Application domains, Application defined content sets, Content types (legal, regulatory, tax, news), Practice areas, Jurisdictions, Classification partitions, etc. Users should be able to override such default filtering attributes if they wish to find documents within broader content bases.

Find operations may be pipelined with other operations to yield unique new operations or products. For example, the output of the Find operation can be sent directly to a print or push email server to create a simple document delivery. A users' profile may be used to contain the set of default and automatic pre-filters for a Find operation that goes against multiple collections to limit the number of non-unique results.

The data requirements for implementing the Find operation should be determined for the content application during design time. The application can provide normalized and canonical names, references and other information for each document sufficient to provide Find functionality.

At the searching level, Find is similar to the Search operation. In general, Find is an implementation and/or user interface issue. From the user's point of view, Find has to do with pulling known documents from the content corpus, while the Search operation scans the content corpus for one or more potential documents that fit the query conditions and so presents a different task model to the end user.

Table of Contents (TOC) Functions

The TOC function as provided by the CCRDS Server 400 is the electronic version of a paper book table of contents, although enhanced with appropriate technology to allow expand/collapse of the heading levels and the linking to documents. TOCs are composed of root nodes at the top of the hierarchy, optional medial branches and leaf nodes at the terminal ends. Leaf nodes are singly linked to documents or sections within a document.

A Browse Table of Contents (TOC) operation allows the user to peruse a hierarchical view of the content of a collection. Because a collection may be comprised of one or more documents, the corresponding TOCs may represent a TOC for multiple documents, a single document, or subsections of a particular document. Conversely, a single collection of documents may have multiple TOCs. A TOC may be adapted to a particular user type as well as the particular DOC collections it references.

While browsing a TOC, the user may have pre-existing knowledge of a particular document they are attempting to find; they may be looking for guidance on an unfamiliar area of law and/or practice; or they may be using the TOC to help frame an issue or problem. When the content collection addressed by a TOC is one document, then the associated TOC may reflect the document's structure. The user will require this type of TOC for navigating large documents, for example, Legislation.

Similarly, when the content collection contains multiple documents e.g., Journal Articles, Statutes, or forms, a TOC can be created showing the presence of each document. This is an important feature for the user who requires a list of all documents in order for the user to be able to browse and select the appropriate one.

TOC browsing functions include navigation access of linked material. For navigation, TOC structures may be narrow, broad, deep, or shallow, depending on the nature and size of the collection. The TOC may have levels of hierarchy that expand (showing lower levels) or collapse (showing higher levels) to aid navigation on screen.

Users descend the TOC by following links from top level nodes into medial and terminal nodes, at each level increasing in specificity. Such links may be shown either explicitly in outline form, folders that can be opened or closed, or using other hierarchical user interface methods. As users descend the TOC, a "bread crumb" trail is created, providing links back to each level visited. Users navigate across the TOC by selecting from the top level nodes and moving back down along another path or by searching the TOC.

The TOC should be accessible when viewing any document within that collection. The relative location of that document to other documents in the collection will be shown by the TOC. The user may navigate the TOC at the same time as viewing any of the documents in the content collection; that is, the document is still open while the user navigates the TOC looking for additional content.

There are several ways that TOCs can be constructed for a particular content collection, e.g., editorially, programmatically, by filtering to create a virtual TOC, by compositing to create a virtual TOC. Of course TOCs can be created manually using a conventional approach. TOCs may be programmatically created by taking advantage of markup contained in the content. In such cases, the TOC is created dynamically and may be organized in a variety of ways. Once a TOC is created, it provides a flexible body of metadata that may be used in different ways by different resource applications. TOCs may be dynamically filtered by a resource application to produce one or more subset views of the complete TOC. Such views may be used to produce running headers and footers that show a particular document's subsection within the larger context of the TOC of a document or a collection. Filtered views may be created by extracting properties of a TOC that limit the view to topical, jurisdictional, administrative, or temporal subsets. Multiple subset views extracted from one or more TOCs may be dynamically extracted and combined to produce a virtual TOC corresponding to a virtual document that does not exist as a single document in physical space.

Subset extraction filters to produce virtual TOC views may be applied against the entire TOC at all levels or against multiple content set TOCs. As above, the results of these subset extractions clip out the desired selected portions. The clipped sections may then be sequenced to produce a new composite virtual TOC. The virtual TOC gives the user the appearance of a single virtual document pointing to multiple references in the same or different content collections.

An index may also be provided. The index maps specific XML tags and codes to the text within a document and also maps the overall text within a document, collection or set into a fully searchable tool.

Load Management

The present architecture facilitates scaling of the hardware and other resources that are common to respond to load. With replicated resources, it is necessary to balance loads, so that tasks do not queue excessively on certain resources when others are fungible for such tasks. Accordingly, the present invention adopts a bid style to load management. This requires idle or low load resources to report their availability for additional processing of tasks that are queued. The bid model may be implemented in part by use of LDAP by the Monitoring component.

Log

The Log tracks events requested by the shared services/tools and allows diagnostics based on what was actually entered. That is, both front end document loading and user searching are tracked to provide real-time monitoring and historical error checking.

Data Management

The Data Management component provides basic system maintenance and optimization.

CCI (Central Control Information)

The CCI component manages where all metadata is stored and monitors it for form in each Data Collection. During intake, the CCI is given a collection's Load Sets. Load sets are tables that contain rules for defining how XML data is to be processed by the shared tools/services. There are Load Sets that contain detailed indexing rules, processing rules for DOC, TOC, and MM, and rules for which elements are processed by which builders. A Load Set can be shared by more than one Data Collection.

DOC

DOC is the service that takes requests, returns documents, modifies, marks up and sets up documents for delivery to the Rendering component. This includes facilities provided by the DOC retrieval engine for document filtering. DOC also provides e filtering options designed to identify and retrieve well-formed portions from complete XML documents.

Utility

The Utility Service is a general service designed to collect miscellaneous services that do not warrant being their own service (which means having their own MQ queue, etc.) The following services will be housed within the Utility Service:

1. Document Locator

This service is used to locate which collection contains a document given a GUID. It is generally used when validating and/or following hyperlinks (which will contain just the target GUID).

2. Result Navigation

This service provides functions for basic navigation within a search result object. The Search Service creates search result objects. The DOC Service is used to retrieve the text of documents. This Result Navigation Service will tie these two together by allowing a client to request the document information (GUIDs) for particular ranks. This information will be extracted from the search result object and returned. The client will then have the necessary information with which to invoke the DOC Service to retrieve the document text.

3. PIT Get

Clients will use a PIT (point-in-time) value as a mechanism to "freeze" their view of the world. As long as the same PIT is used for subsequent common content repository service calls, the view will remain constant (they won't see any new data that has been loaded). When a client requests a new PIT, it will be resetting its view to the point-in-time current at the time of request.

4. Persistent Object Destroyers

As defined in the Persistence Service specification, the destruction of persistent objects will be the responsibility of the client. The Persistent Object Destroyers Service will provide the APIs by which the clients can cause this destruction to occur. A separate and unique API will be created to destroy each type of persistent object.

Persistence

Although the Persistence service appears in FIG. 4 as part of the AR Server 300, it is closely associated with the common content repository and CCRDS Server 400. The function of the Persistence component is to store search results for subsequent access without requiring the re-execution of the search. For example, a given search might lead to retrieving identifiers for one hundred relevant documents. Documents one through ten might be displayed while eleven through one hundred are retained. Thus, if the user selects document fifty, document fifty can be determined later from the Persistence component by accessing stored identifiers, without having to re-execute the search. With multiple users accessing the common content repository with the search component, the Persistence component eases the burden on the search component.

Web Server, AR Server

The Web Server 200 and the AR Server 300 components provide an application framework used to create and deploy web-based applications that are based on data residing in the document repository of the CCRDS Server 400. As part of this framework, the AR Server 300 has a high-level goal to promote shared information on a customer across participating business units. A common repository stores user information for the participating business units. These components also support a single sign-on for multiple applications by a user.

The AR Server 300 is a single host platform allowing access from a plurality of different user interface components associated with different resource applications. This platform has a set of components that provide some common functionality, as well as Rendering, Localization and Alert services. The platform also includes a common standard design for implementing persistence to support failover and components that support high availability. In addition, reusable, generic persistent data components are made available. A security model is provided for authentication and access control to ensure a single view of a customer. The platform further includes common procedures for monitoring, management, and deployment.

The components of AR Server 300 provide a tool kit for resource application developers to customize applications for specific user interfaces that draw commonality from the data repository of CCRDS Server 400. A discussion of significant components of the AR Server 300 follows.

Duplicate Detection

The Duplicate Detection Service acts as a filter to prevent the same document from being shown again, unless it has been modified since it was last seen. The duplicate document problem arises when, for example, a user submits a query to a DOC collection and receives a list of documents containing duplicates, with only marginal differences in title, source, or version. This can, for example, happen with news stories, which may be similarly reported in a number of newspapers that provide articles to the common content repository. It has been found that as much as 30% of the documents returned from a news search may be members of a duplicate document set. Of the set of duplicate documents, over half of all documents that can be considered duplicates fall into the exact duplicate category. However, it may also be of interest to include fuzzier notions of duplication for detecting highly similar but not identical documents.

Document duplication detection can be viewed, at a sufficient level of abstraction, as comparing two text strings; this time, however, instead of a quotation and a candidate source document, one has a document and a candidate source document. It has been determined that the top n (where n is a relatively small integer) document idf terms (including tokens and their positions relative to each other) are sufficient to provide a "fingerprint" of a document for purposes of comparison. Here idf means "inverse document frequency" which, for a given term is the inverse of the "document frequency" for the term, i.e., 1 divided by the number of documents in the collection under consideration that contain the term.

This fingerprint must be prepared as a metadata field for each document that is to be used in a duplicate detection system. The provides a computational task that must be performed at the time of document intake, although it can also be done later, for a document collection already loaded into the common content repository. To help spread the computational load of actually doing the fingerprint comparisons when search results that may contain duplicates are produced, the comparison task is divided between the client side (from which the search request originates) and the server side. Thus, duplicate detection involves essentially three steps:

A. Metadata Generation—During Batch Load Process

During a document intake session, for each document, a complete document signature will be stored as a form of metadata (length scalar+fingerprint vector).

The document 'length scalar' (in tokens, excluding source, title, author and other header information) will be stored as a part of the signature.

The 'fingerprint vector' will consist of the top n (where n is four to thirty, preferably four to six, and most preferably, six) unique idf terms for the document (excluding header information), along with their positions relative to each other, e.g., {prevarication[76], hostage[0], conspicuous[25], intransigence[121], brutality[163], theater[13]} (ranked by idf values).

Note that the terms under consideration would exclude the document title and other headings (because these can clearly vary in documents due to different titles, publishers, editions, etc).

Note also that terms with an unusually high idf, i.e., idf>0.8, would not be considered as top six candidates because these tend to be aberrations (i.e., typos and misspellings).

The fingerprint vector will then be hashed into a key of manageable length, e.g. [!x9v^4#w+z2%7t$d] (16 bytes). The document's highest idf terms are only permitted to appear in the vector's top n idf terms once, even if they appear in the document more than once.

B. Document Comparison Operation—On Server Side, Given a Search Result List.

On the server, beginning with the top-ranked document in the search results and the next document yet to be compared with it.

Document lengths will be compared: if the comparison document is within ±M characters (e.g., where M is 0 to 256, preferably, 40 characters) of the base document, continue; otherwise, end the comparison (±M serves to compensate for potential differences in text near the header material);

Document fingerprints will next be compared: if the comparison document has an identical fingerprint as that of the base document, then flag the duplicate document as a duplicate; otherwise, end the comparison;

Documents flagged for duplicate status will be effectively moved into the Duplicates folder on the client.

The next highest-ranked document not already flagged for duplication will then be compared with all other documents of lower rank in the result list that are not previously flagged.

The process will continue until the last pair of unflagged documents has been compared.

C. Document Rendering—On Client Side.

(1) Documents with no duplicates appear in the standard search result list;

(2) Top-ranking documents that have duplicates appear in standard search result list, but are marked to indicate that their corresponding duplicate documents appear in the "Duplicates" folder (e.g., appearing in lower left-hand corner of screen);

(3) The remaining duplicate documents appear in the "Duplicates" folder.

Implementing this duplicate detection system involves some additional considerations:

The highest-ranked unflagged documents will be maintained in the standard result list.

idfs will doubtlessly change over time; a fingerprint generated today might not correspond to a fingerprint generated next year if the collection upon which idfs are obtained changes. To avoid the need to periodically reproduce a document's fingerprint, then it is important to maintain the large, stable collection upon which the idfs scores are based. Alternatively, once the large, stable collection is determined, the terms and their corresponding idfs could simply be economically stored in a lookup table.

In a document such as news article, it is possible for all n top idf value terms to come from the same paragraph. This would thus seem to represent poor cross-document coverage.

However, a news article is not long, on the average roughly a page in length. Even though it is a remote possibility for all n high idf terms to occur in one relatively small locality, this does not go to say that their coverage of the document is in any way diminished. Fingerprint coverage remains intact since the absence of the highest idf terms in other sections of the document is also useful for detection.

One could add a degree of "fuzziness" to the duplicate detection process by opting not to hash the fingerprint vector and instead, allowing a ±1, ±2, or ±N relationship between terms in the vectors being compared. Thus, to adjust a system to a desired level of duplicate detection, the fingerprint and/or length scalar parameter differences between two documents can be measured against a multi-factor predetermined, but adjustable, similarity threshold.

Hashing may add an extra level of strictness to the document signatures to be compared, because modest variations in idf values may change the orderings of the top n idf terms, but not the terms themselves. So the hash of termA[0], termB[25] . . . would differ from termB[25], termA[0] . . . . Thus, unless the idf calculations were stabilized using a standard master collection, more comparisons might fail because of the above phenomenon.

Document Rendering Component

The Document Rendering component maps documents to an application-specific stylesheet. Each document is embedded with a stylesheet reference tag according to AR Server standards. The rendering component requires external inputs. These inputs include the application developer's custom stylesheets and a mapping of stylesheets to associated stylesheet GUIDs. The inputs are retrieved by the rendering components using the file system and the common content repository system.

Figure 19:
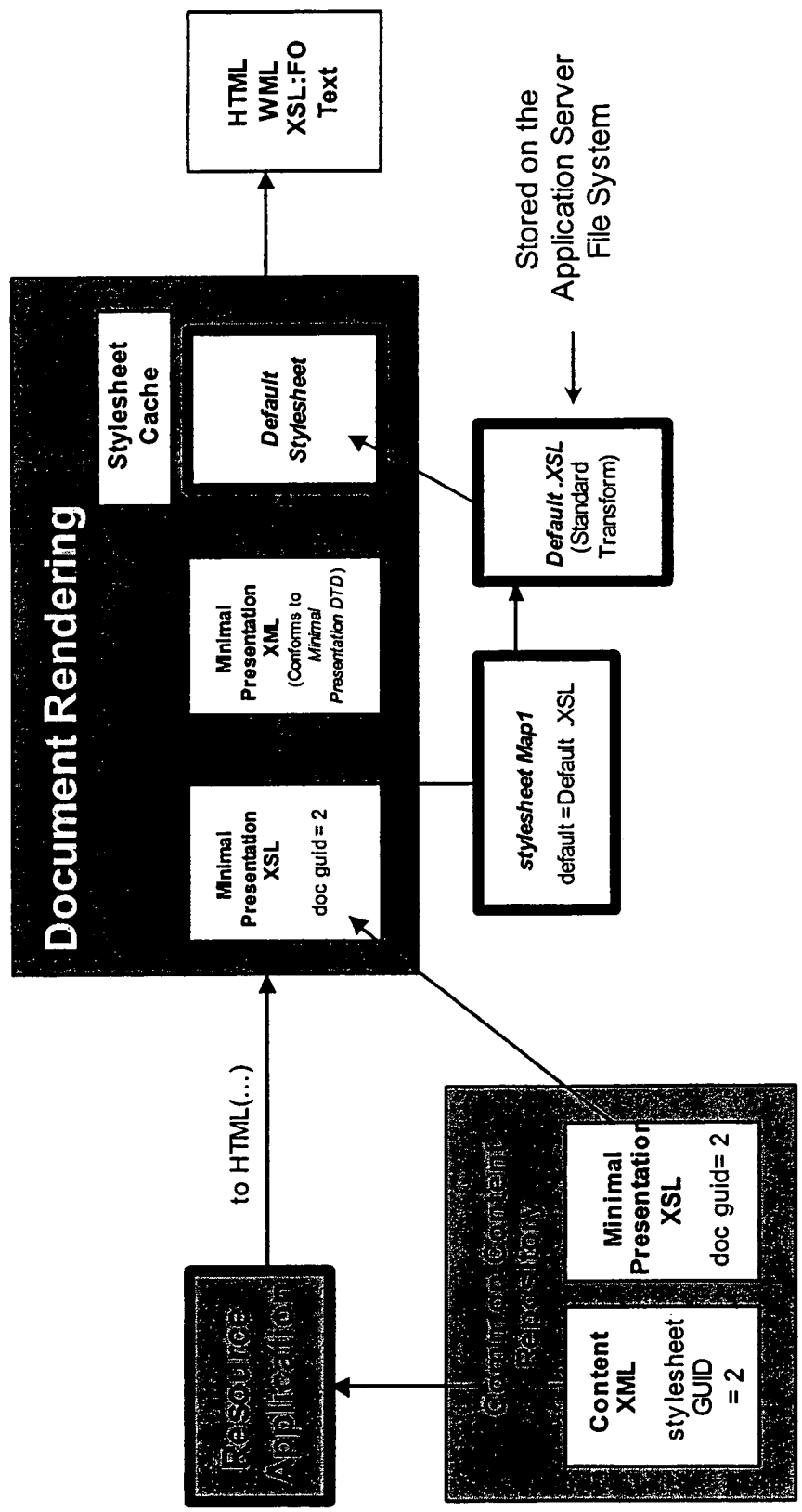
FIG. 19 is a schematic block diagram showing how document rendering functions with a minimal presentation stylesheet.
Figure 20:
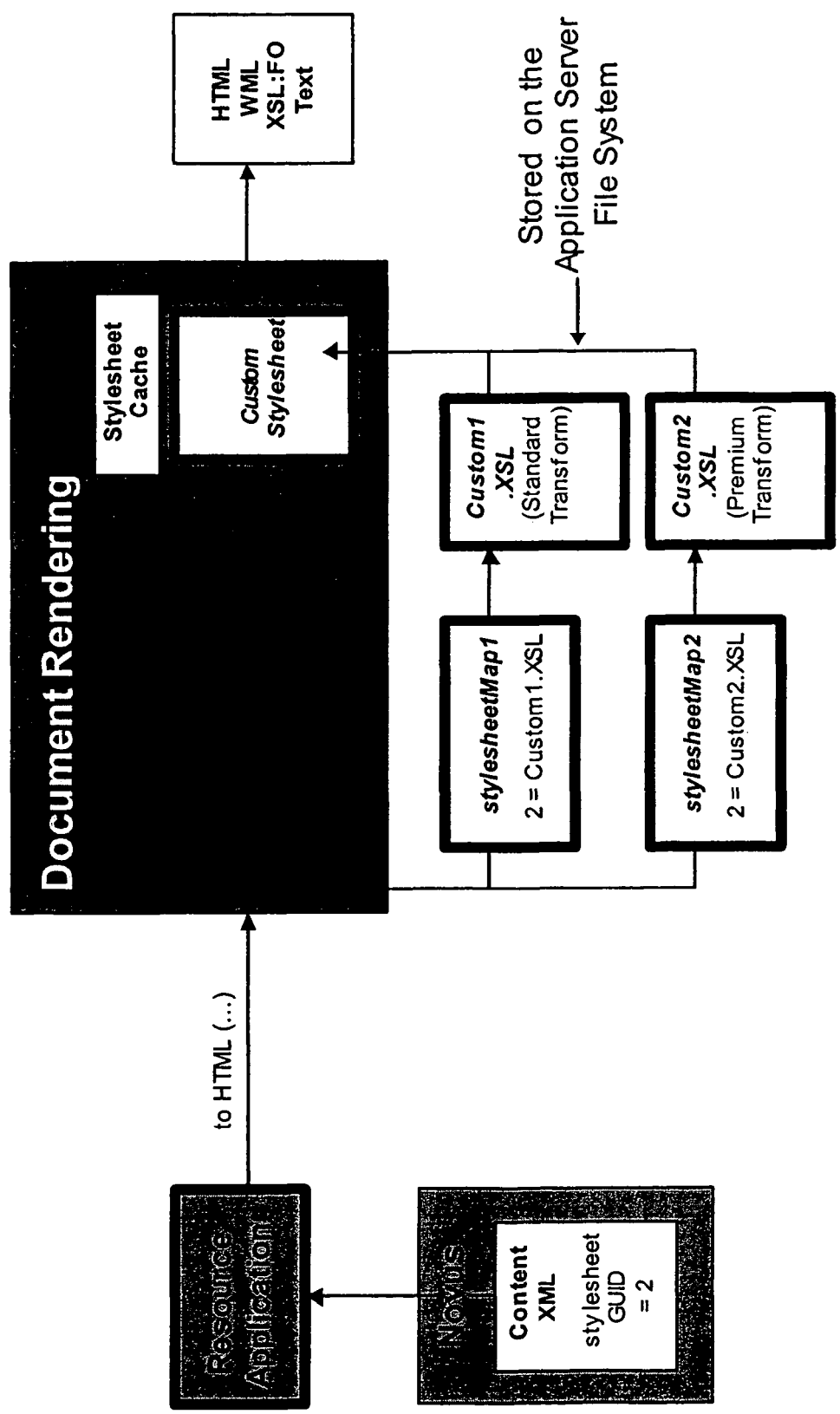
FIG. 20 is a schematic block diagram showing how document rendering functions with a custom stylesheet and multiple stylesheets.

The document rendering service maps and caches XSL stylesheets. The resource application uses toHTML( ) to style the XML. FIG. 19 shows schematically how document rendering proceeds with a minimal presentation stylesheet. FIG. 20 shows schematically how document rendering proceeds with a custom stylesheet and with multiple stylesheet maps.

Favorites Online Application Specific Information Storage

This service allows a user to select, store and access routinely used documents, collections, search strings, or sets. This component also allows a user to add comments to a given document that are then stored with that document for that user. Other examples of information that can be stored include, Saved Searches, Saved Quick Links to Documents, Saved Quick Links to Alert Definitions. The information is stored as a dynamic hierarchy that can be manipulated by the user. The feature is similar to the Favorites feature of conventional web browsers.

Image Conversion

The Image Conversion component of the shared services/tools converts TIFF to JPEG images, or performs other image format conversions. The component also supports a feature for resizing images and supports image manipulations, including scaling, rotating, cropping, and filtering. Conventional image conversion components may be used.

Localization

This component allows the users to individually modify their local user interface and provide for customization. For example, a user interface may be translated into Spanish or developed in Spanish for a particular market. Also, to the extent natural language inquiries are permitted, localization may require that all or portions of an English language search engine be replaced with search components specific to a local language.

A locale may be specified for a user by language, country and variants of these. Both text and images can be localized. One properties file and one directory is set up per locale.

Alert API and Service

The Alert service allows customers to select search queries, which run at specified intervals. Search results are delivered to the end user each time the search query returns a new result. The Alert service uses the shared services/tools document delivery mechanism for e-mail and facsimile. The following components are part of the Alert service: a database for holding the Alert entries; an API for manipulating Alert entries from the user interface; a service for running the Alert entries and delivering the results to the customer. These components allow each resource application to use the same Alert services for their specific application.

Figure 16:
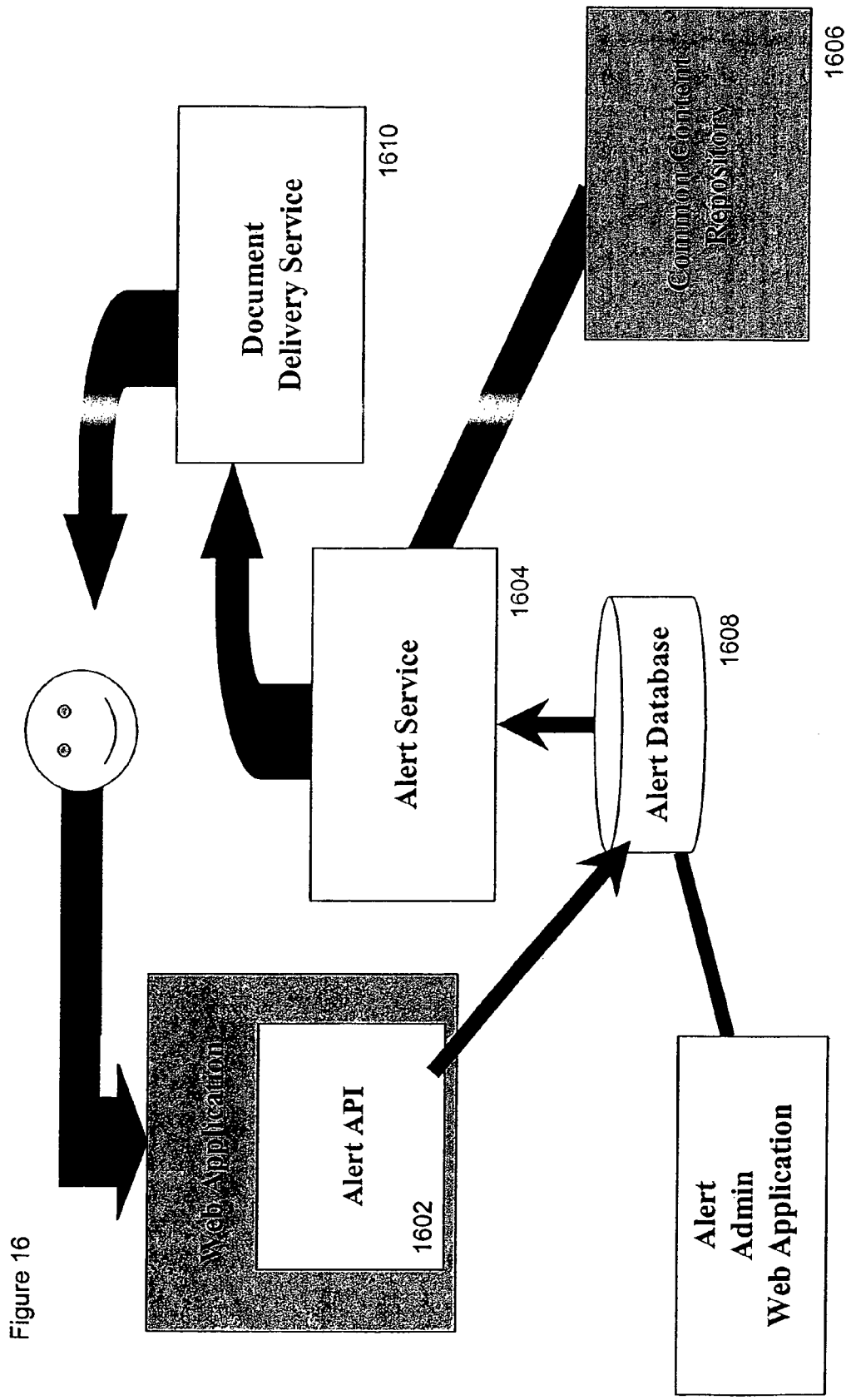
FIG. 16 is a schematic diagram showing how the Alert service provides clipping.

As best seen in FIG. 16, the Alert for any user is set up with entries in a directory using Alert API 1602. The Alert entries can be created, edited, deleted or run. Frequency for running the document selection data defined in an Alert entry can be set at daily, weekdays, weekly, bi-weekly, monthly or save (keep but never run). An Alert Service 1604 interacts with the common content repository 1606 and a Alert database 1608, then delivers the clipped documents via the document delivery service 1610. A user is able to clip across multiple DOC collections.

Document Delivery API and Service

The Delivery Service allows the user to create physical or local electronic copies of online documents. The deliver function can be accessed at any point in the research process. To deliver a document, users generally specify the following information: what to deliver, inclusions and omissions, delivery destinations, and format.

To determine what to deliver, the resource application is assumed to present at least one way of accessing the Delivery function for a specific document or artifact. Whether done via direct indication (e.g., a button on the page) or indirectly (e.g., print link), functionality is identical. In general, it is assumed that an entire document or artifact is to be delivered. For certain large documents, the user should be allowed to deliver only specific parts of the document. Facilities such as a Table of Contents can be used for selecting the parts of a document to be delivered.

When determining what to include or omit, the default mode for the delivery operation is to include the entire text, and the full set of images and tables associated with a particular document. Additional items can be included or omitted from the delivery job, depending on the document type or other properties. Users should be able to uncheck each item as appropriate for document type.

The destination will be determined based on the user's preference and availability of the destination device. For example, some destinations may include an attached printer (the printer attached to the user's computer or local area network), an Email address (instead of printing the job, a formatted copy of the file is sent to the users email address), a Fax machine (a formatted copy of the file is sent to the user's fax address), or download (a formatted copy of the file is saved to the destination specified by the user on their computer's hard drive). Users should not have to specify a destination address until they select that destination as a default.

The user's preferences for delivery (and a variety of other options) are specified in a file that holds default values for resource applications and the shared services/tools.

Figure 18A:
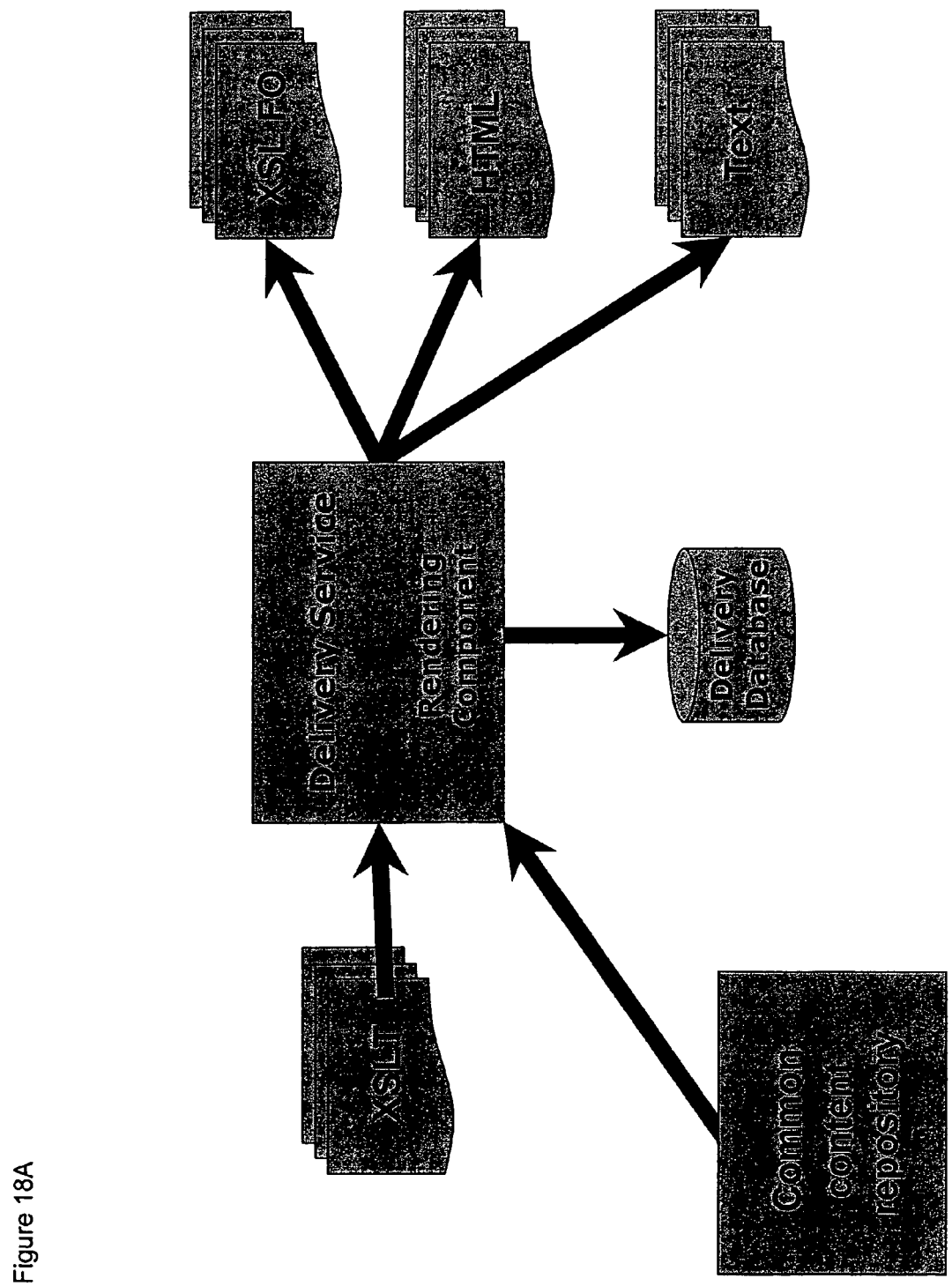
FIGS. 18A-18B are schematic relationship diagrams showing how the document delivery service functions.
Figure 18B:
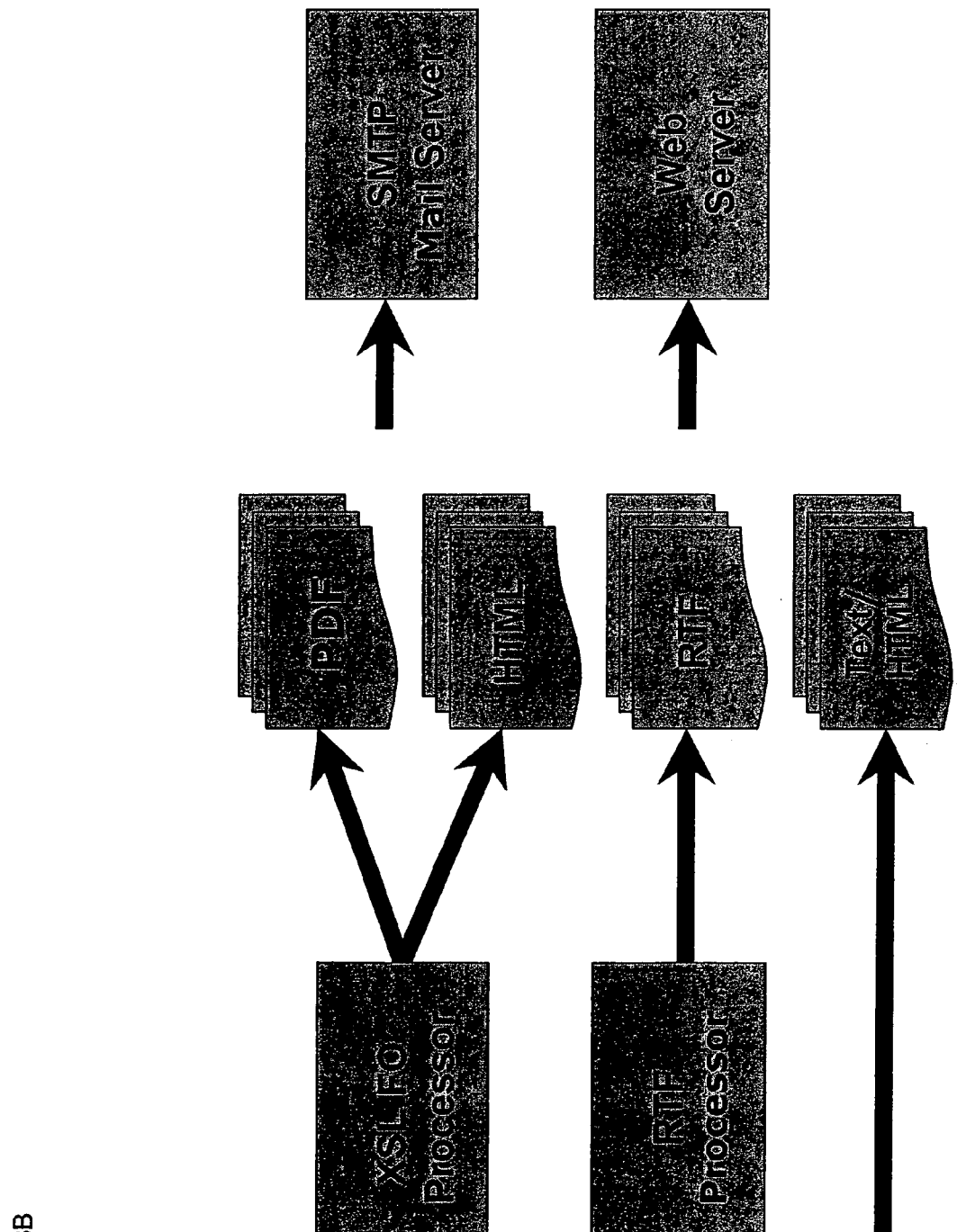

The formats supported for document delivery include HTML, RTF, PDF, PostScript and text files. FIGS. 18A and 18B show the relationships between various components involved in document delivery. Documents to be delivered are kept in temporary storage from which they are accessed by the delivery service, which provides them to the rendering component. The Delivery Service has a rendering component and takes in XML and XSLt documents. It delivers these out in XSL FO, HTML and Text formats. An XSL FO processor produces HTML and PDF/Postscript documents that can be sent by SMTP mail. The RTF processor produces RTF documents to the Web. Mixed Text/HTML documents may also be delivered.

Trail API and Service

The Trail Service maintains a transactional history of recreateable application events. This enables a user to quickly find a document without requiring the user to redevelop the research events to recreate the document results. That is, the system keeps information about the research as carried out by query to the common content repository and the results generated, but not the text of the resulting document(s) itself. For example, each document is identified with a GUID (Global Universal Identifier) and a "best-of-the-searched-GUIDs" can be stored for reference by the Trail function. Each time a user starts a new session on one of the resource application, a trail of the user's requests and retrievals is created. When a user needs to go back to a previous request, the Trail component provides quick access to the document by using the trail established during the searching process. The Trail component may also allow a user to take advantage of research from a previous session by allowing the user to save trails or access previous trails.

Figure 17:
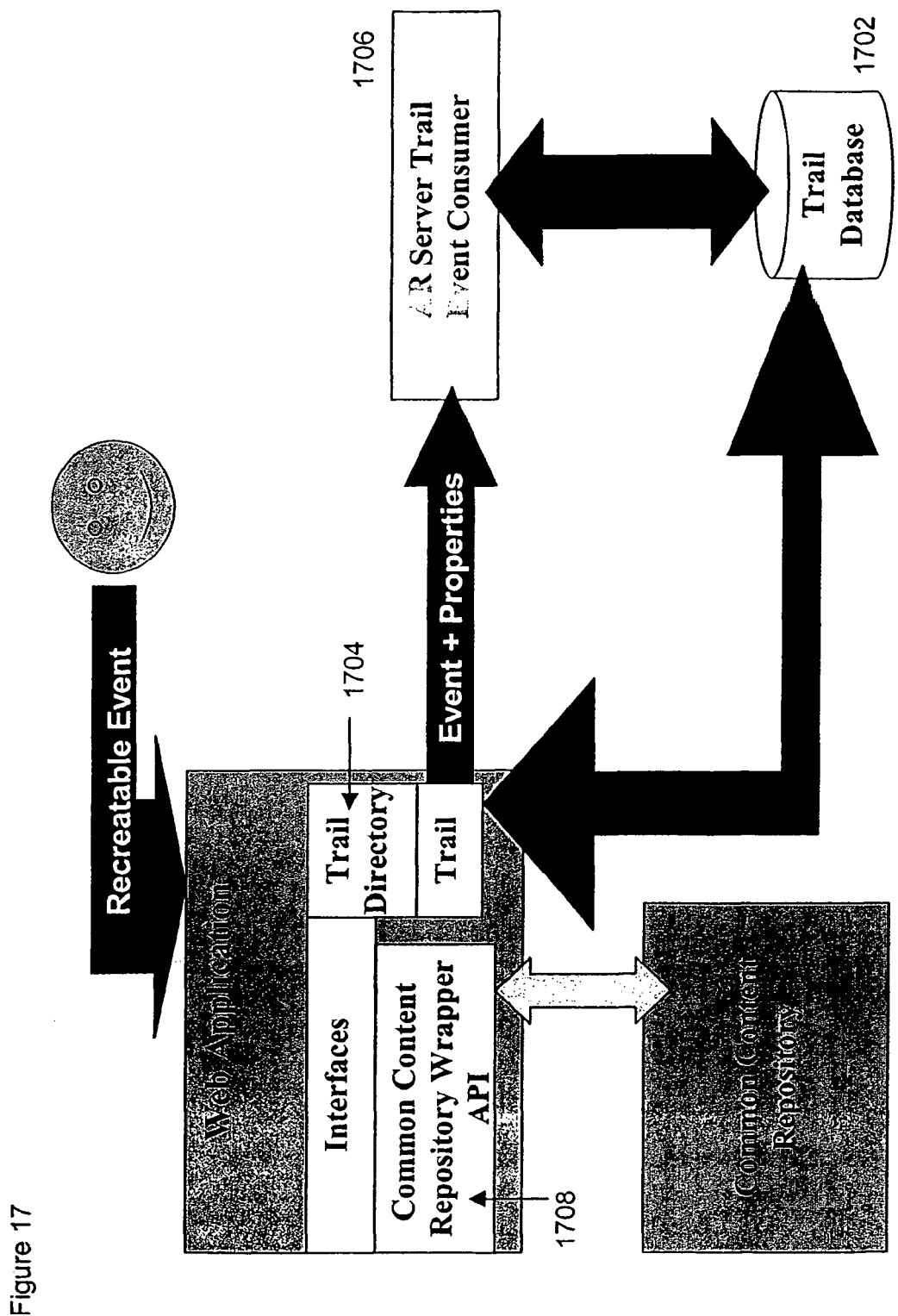
FIG. 17 is a schematic diagram showing how the Trail service functions.

Trail functions allow the user to access previous research in a simple and rapid manner by collecting the sequence of operations that were executed by the user in a data structure held on the Trail Database 1702 (see FIG. 17). A Trail Directory is used to specify the create, delete, modify and retrieve actions. Trail functions give the users access and allow them to manipulate the trail data structure.

The Trail record is created during the research session and held as a data structure in the resource application. The Trail data structure is specific to a particular password, and, where recorded by authentication methods, the client ID as well. Events recorded in a trail may correspond to basic chargeable research events, e.g., primarily document pulls, searches, and citator requests. Each event recorded in the trail can be recreated; By clicking on the event the user can return to a document, rerun the search or citator, etc.

The resource application exposes an interface that allows the user (via the trail event consumer 1706) to access the trail facility at any time during a research session. Similarly, the trail facility allows the user to re-enter seamlessly the research session at the point where the user left it.

The application flow for a Trail works in the following way. The application creates a new trail, setting specific information (e.g., trail name, product, user id, client id, etc.). The trail also contains the date created, date last accessed, and date expired. Additional parameters can be defined and used specifically by a product. These "properties" are stored in an XML string, which is not database searchable. Alternatively, the application obtains a specific preexisting trail by unique trail key.

For a product's "recreatable event" (e.g., search result, document, etc.), the application will create a new trail item and add it to the trail. The trail item stores specific information, such as the item type (e.g., search, document, etc.), and date created. Additional parameters, defined and used specifically by a product, can be stored. These "properties" are stored in an XML string and can be used to recreate the event for that product.

The system puts trail requests on a queue and a background service processes them. FIFO (First-In-First-Out) format is used to process the requests. The service is constantly monitoring the queue for new requests. If a database failure occurs, the queue will back up and delay trail information to the user. It will not slow down application performance.

The resource application views the most up-to-date trail information available. The application uses the Trail API 1708 to create a list of trail items (e.g., a web page with links to the recreatable events) for the customer (note that the recreation of the events will be controlled by the application to ensure correct billing events are created or avoided depending upon the business rules for that particular product and so the event will not get recreated on the trail).

The application will close the trail when the user's session comes to an end or when the application explicitly closes the trail.

Another use of the Trail information is system improvement to fits users needs and expectations. Thus, if the system has one or more trail files for holding information about users' searching processes within a particular resource application and identifiers for documents found in response to inquiry messages, this information can be provided to a trail analysis component for processing trail files to determine common usage patterns for a particular resource application. This analysis can lead to adjusting parameters of the resource application to present searching options and search results in a manner more consonant with such usage patterns.

If the analysis yields common usage patterns that involve the sequence in which users display documents identified in search results relative to the priority order in which documents are presented as search results, the parameters adjusted may affect the priority order in which documents are presented as search results. If the analysis yields common usage patterns that involve the users' review of documents identified in search results as duplicates, the parameters adjusted may affect the similarity threshold for a duplicate detection service. The Trail analysis may also lead to common usage patterns that are captured in metadata files to embody such usage patterns and make them available to relevant resource applications. For example, if the Trail analysis of the most experienced users of a resource application reveals a best practices TOC usage pattern that shows little use of certain TOC branches or a certain pattern of explorations from a TOC node, this may lead to TOC pruning, expansion or reorganization to create a TOC that can be offered as embodying observed best practices and may be of value to less experienced users.

Event Billing/Logging API

The shared services/tools provide an API that allows developers of resource applications to produce billing records from the web application. The billing records are generic, allowing resource application developers to capture data necessary for their billing needs. The API provides the information necessary in XML, but the application developer is responsible for providing the resource application that converts the generic XML to the proper format for its billing system.

The API creates events with resource application specific name/value pairs. The billing/logging function delivers billable event information to a business system consumer. Certain default properties exist for the billable events: thread value, machine name, timestamp and EventGUID (a globally unique ID for the event).

Security Services; Security and Access Control API

One portion of the security and access control involves authentication, which includes a Sign-on and Sign-off. The sign-on operation identifies the user and initiates the resource application research session. Sign-on requires a user identifier (user id) and a user authenticator (password). These can be generated by the resource application or by the user, including easy to remember aliases (so long as a unique identifier string is provided). The Signoff operation closes the session.

Access Control operations are needed when the resource application needs to monitor usage and/or restrict access; the user requires customization of the interface on an individual or group basis; access must be monitored at the content and/or function level; user access must be shared across application types referencing the same content (e.g., web and intranet access to the same content collections); or user access must be shared across multiple resource applications.

Figure 13:
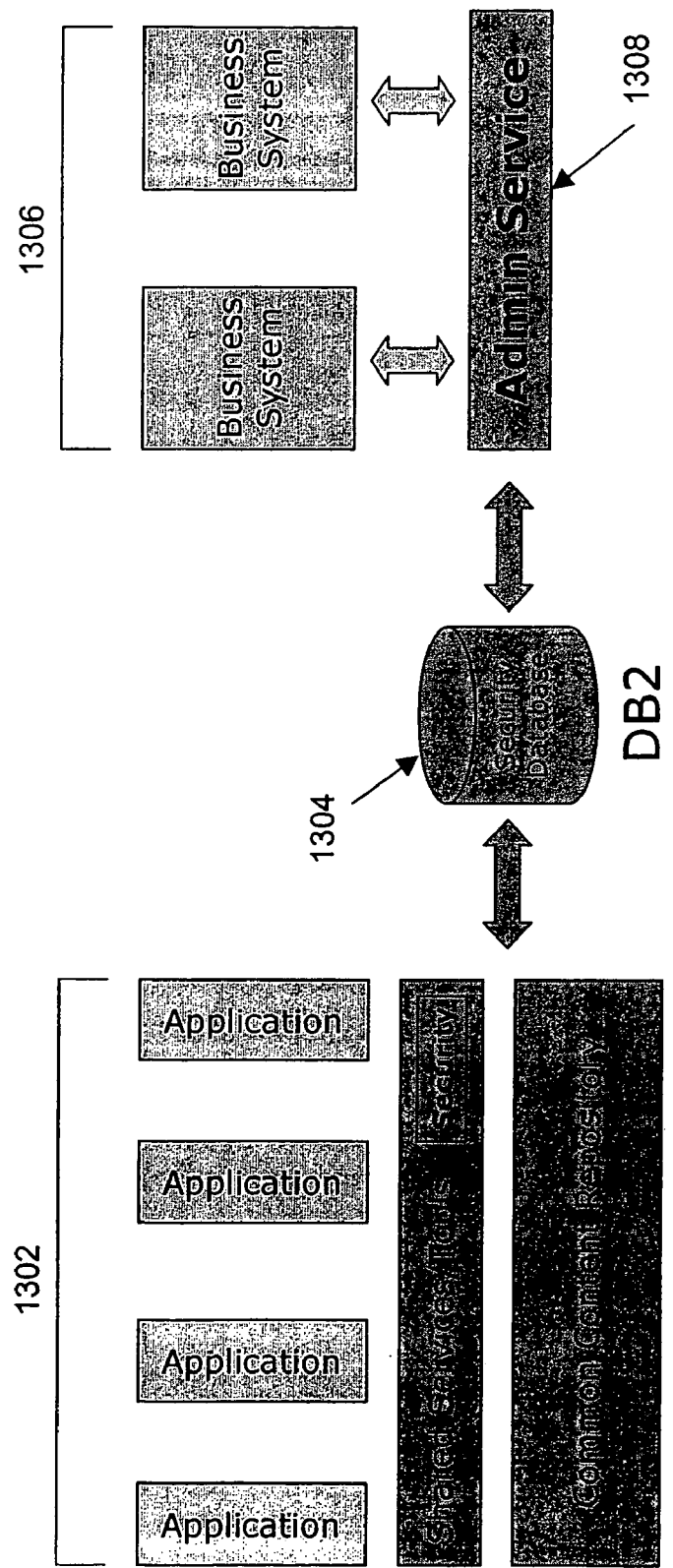
FIG. 13 is a schematic block diagram showing how Security services function in the present invention.

With the present invention, multiple resource applications are linked across a common system. As such, the authentication process provides access to a user for all of the various resource applications that the user has rights to use. However, as these various resource applications have their own usage requirements and billing parameters, connection and recording of the user ID/password to the usage tracking and billing applications is the responsibility of each resource application. In other words, a common user profile is created and utilized. FIG. 13 provides a schematic overview of how the on-line shared security components communicate with resource applications 1302 and interpret security information stored in a security database 1304 to provide validation of the users and their inquiry messages based on user subscription information. FIG. 13 further shows how the Business Systems 1306 that maintain definitions of customers, products, price plans, subscriptions, etc. push application security definitions to the security database through administrative services 1308. The administrative services expose an API that allows maintenance of the database. The API is based on XML request response messages. Security information specific to a resource application may be used by other applications.

Security as implemented in the shared application services provides a consistent view of a customer. By creating a User entity in the shared application services Security Model, customers can move easily among participating sites (or resource applications) without the need to remember a specific set of credentials for each site. This means that users need only one sign-on ID and password for all participating sites and that the users' credentials are stored in one secure place (Security).

Thus, the common sites sharing Security to authenticate users save time and money by not having to build, buy, host and maintain their own authentication system. Developers can concentrate on their own site's features and functionality.

Security supports a basic profile of the user. Information such as language preference and first and last names can be populated at account creation time. The user within the Security model is assigned a User GUID (global universal identifier) when the account is created. It is this identification that is used to identify this user.

The Security service performs a variety of security tasks. The task include: authenticating an existing Security User; enabling the resource application to perform authorization; updating an existing Security User; adding a new Security User to the Security Database; associating or un-associating a Security User with a Group to grant access to certain features. Other security features include, tracking for volume or pricing limits, timing entitlement limits, export control.

Figure 14:
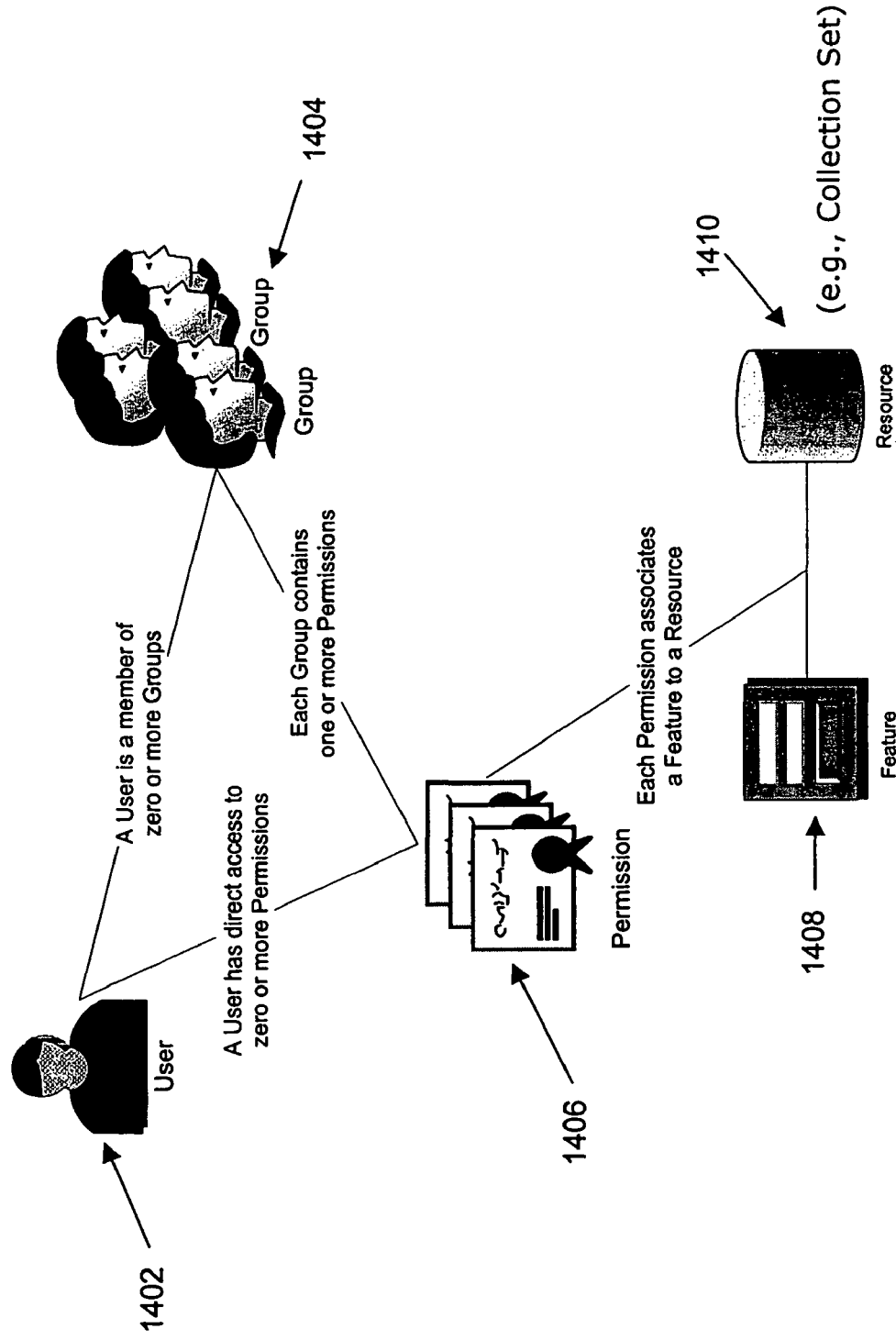
FIG. 14 is a relationship diagram showing how Security is implemented and user Groups and Permissions.

FIG. 14 schematically shows the security paradigm used. Security includes a user 1402, a user group 1404, and permissions 1406 for the user. A single user definition can be used for all the resource applications. Thus, one user ID and password can be used to allow the user to access the documents from any resource application. Each user is granted specific permissions that become available once the correct ID and password are entered. The user ID and password are set up and changed using the Security API. Each permission associates a feature 1408 to resource 1410, such as a collection set.

A user may belong to a user group. A user group represents a class of users. All the users in the group are granted the same permission. Once again, a user group can be defined once and then used by all the resource applications.

Figure 15:
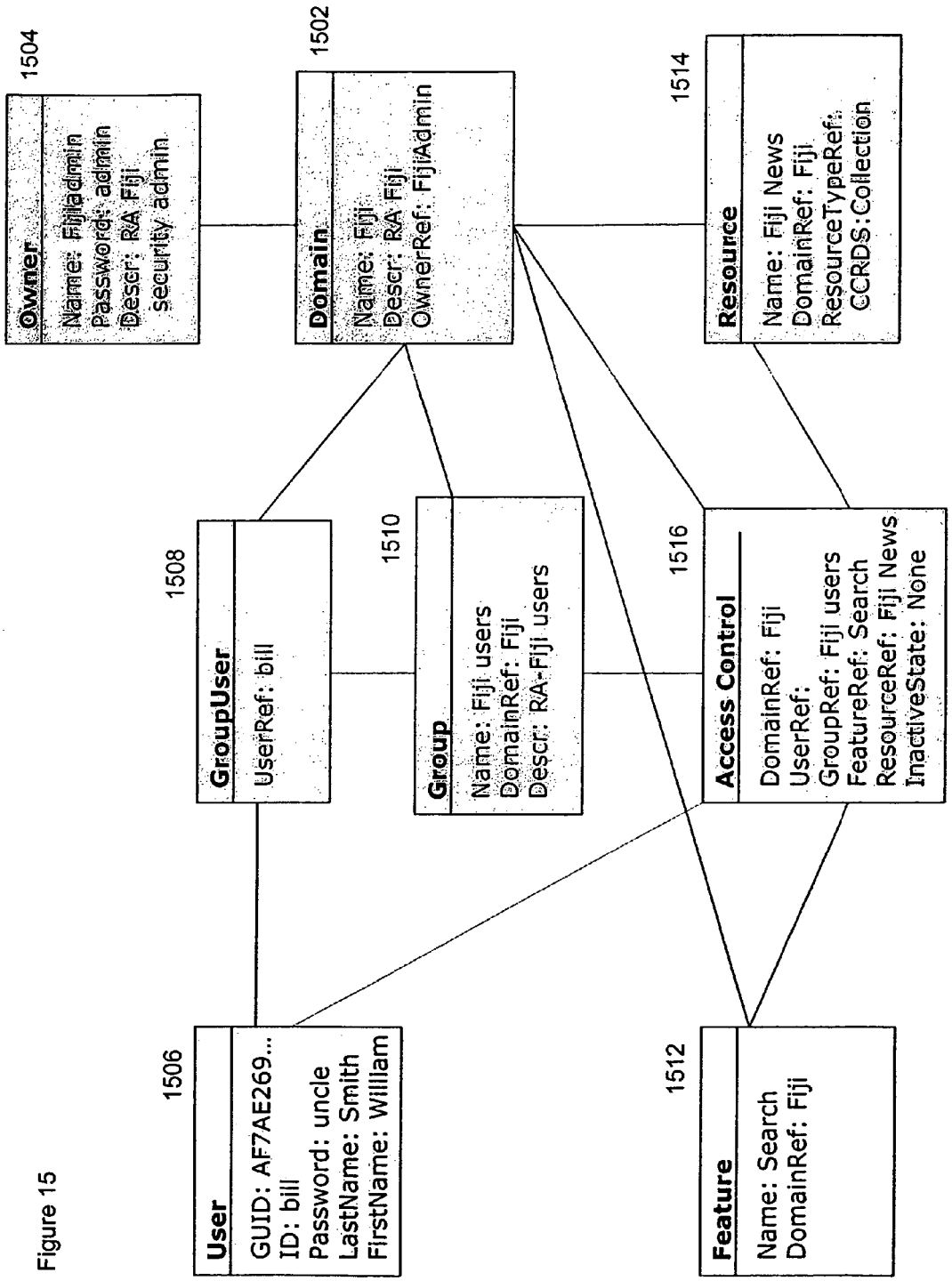
FIG. 15 is a data definition and relationship diagram for the security model of the present invention.

FIG. 15 shows the components of the security model for one embodiment and their relationships. To set up this model it is first necessary to set up a domain 1502 that defines a name qualifier for application specific entities. This allows duplicate names across applications, e.g., Fiji: search. The Owner 1504 then defines a user ID and password for the administrator. Next a user 1506 is defined. As noted, a single user definition can apply for all applications (users are independent of domains). A user ID, password and other user profile information are assigned. The User GUID is at the foundation of the definition.

If the User defined is part of a group, the GroupUser entity 1508 is used to add the user to a Group 1510, which represents a class of users. The definition of a group simplifies administration by allowing permissions to be defined once and assigned to many users. Groups may be defined in terms of hierarchies. A parent group may have one or more child groups. The child groups inherit permissions from their parent group.

A Feature 1512 is defined as a resource application function that may require separate control or pricing (e.g., doc pull, clipping). Through the security model, a User may be granted or denied use of a feature to access specific content or a function. A content Resource 1514 represents a defined subset of content that requires separate control or pricing (e.g., Fiji news, Fiji cases). Common resource types defined for the security model are a DOC collection or a collection set.

An access control object 1516 can also be defined in the security model. An access control grants or denies permission to access a content resource (e.g., world news) through a feature (e.g., Search). Such access control may be assigned to a group or an individual.

When a subscription is defined, the user, GroupUser, Group, access control, feature and resource elements of the security model are linked together.

Multi Tier Environment

Resource applications utilize the components of the AR Server 300 and the CCRDS Server 400 to develop unique products for retrieving documents.

Figure 5:
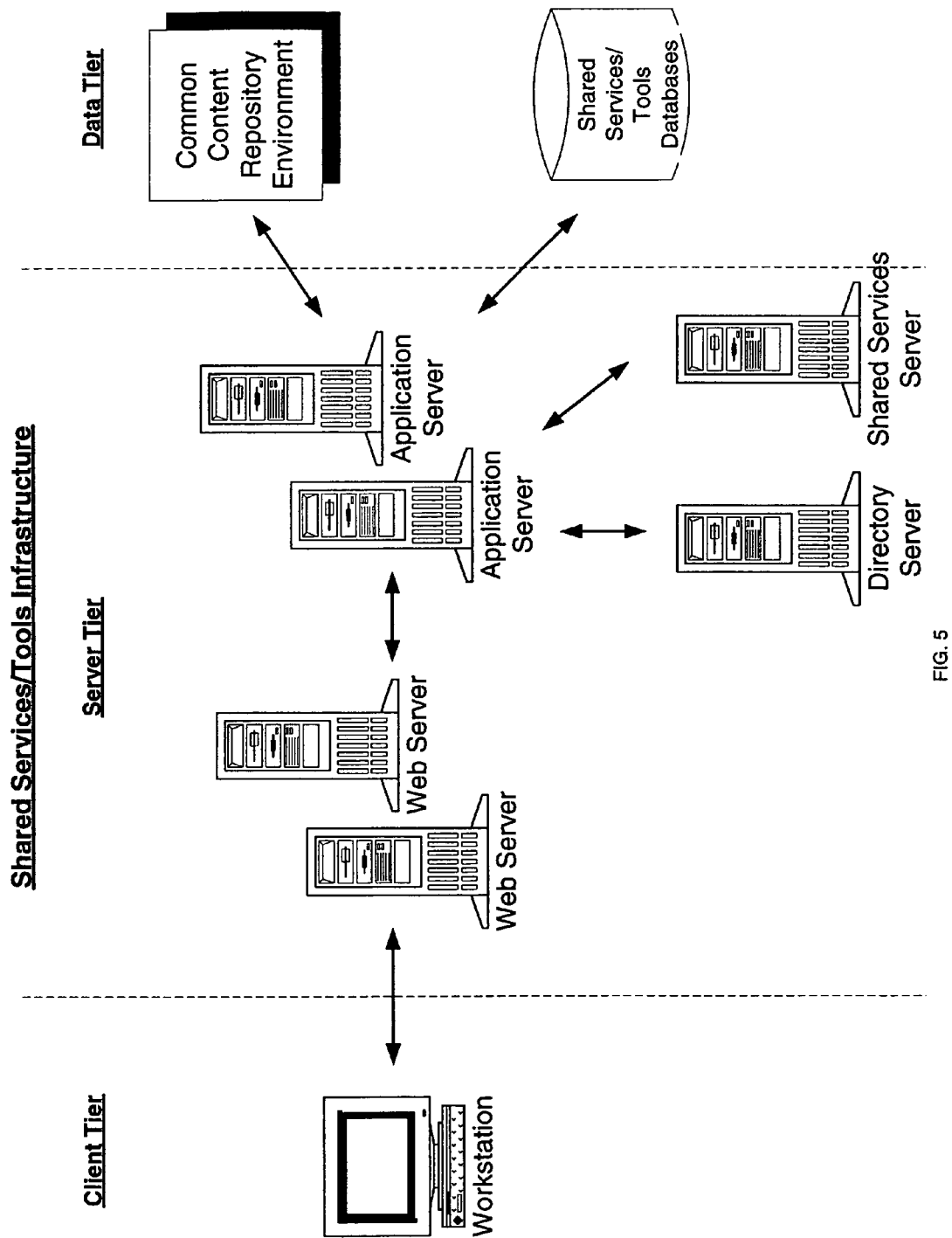
FIG. 5 is a schematic diagram illustrating the client, server and data tiers of a system as in FIG. 4.

FIG. 5 illustrates the client tier, server tier and data server tier structure of components that form a resource application and its infrastrucure. One user is used to represented the client side, although many different and diverse client user interfaces will access the system. The client's user interface will access a web server provided by the online delivery environment, which in turn provides the appropriate application server and protocol depending upon the specific user interface. As searches are executed, the shared services server, directory server and the application server interact with the data tier to gain access to the databases to retrieve documents.

Development Environment

Figure 7:
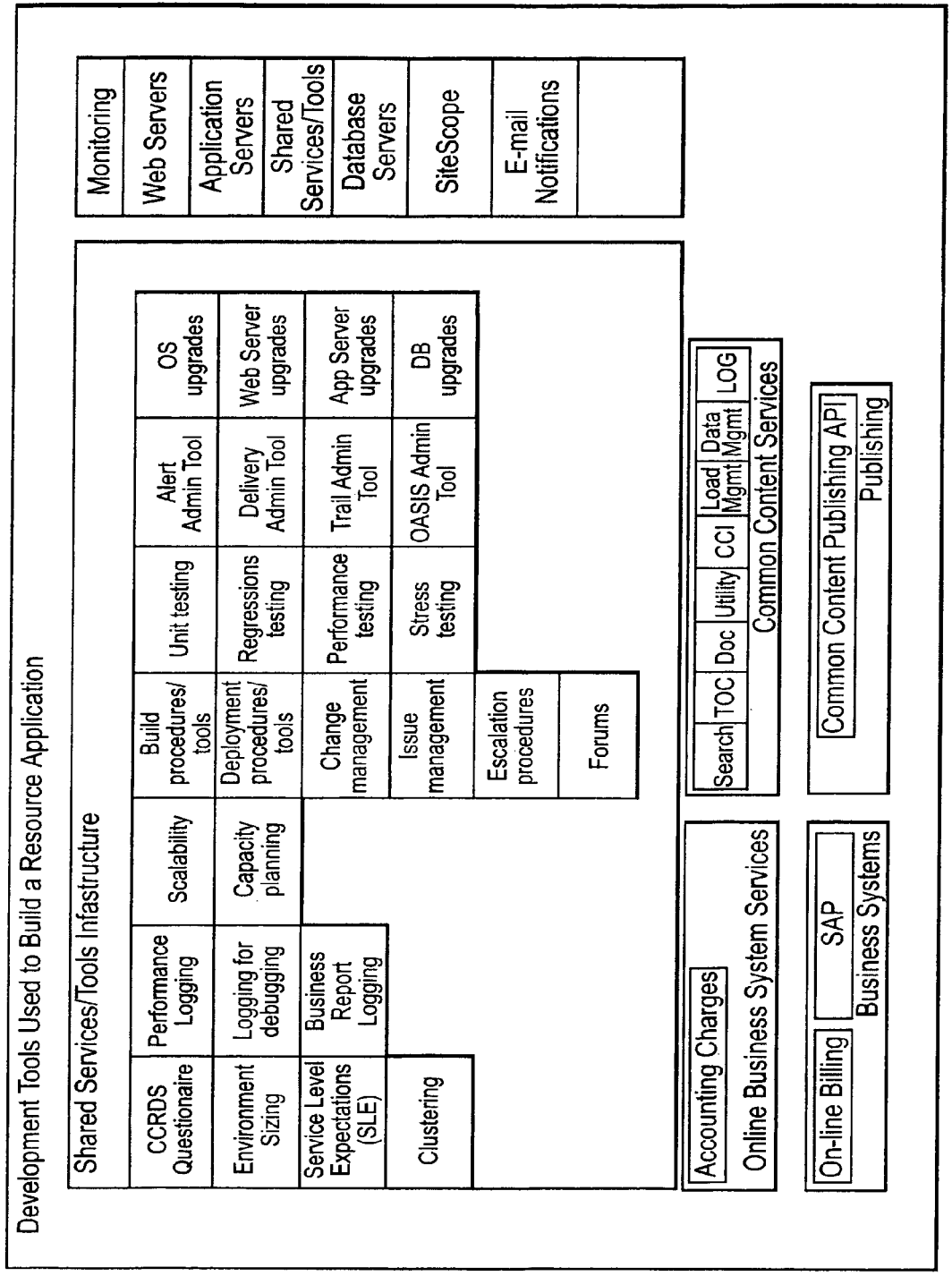
FIG. 7 is a schematic block diagram showing the development tools used to build a resource application.

FIG. 7 shows a development environment for resource applications under the present invention. The process begins with the questionnaire defining the desired product features, environment sizing, service level expectations and clustering. Development also includes various kinds of logging for performance, debugging and business reports. Scalability of design is considered with capacity planning. Tools and procedures for building and deploying are needed for the development process, as well as procedures for change management, issued management, escalation and discussion forums. As components are built, there is a need for unit and regression testing and performance and stress testing. Various tools for administration of Alert, Delivery and Trail functions are also used in development. Finally, the resource application development process must address operating system, web server, application server and database upgrades.

The preceding development services and tools are employed together, and monitoring is used for the various web servers, application servers, shared services/tools and database servers. In addition, the development process necessarily calls on the on-line business services, the business systems, common content services and publishing components that are part of the common content repository.

Although the present invention has been described with reference to preferred embodiments, persons skilled in the art will recognize that changes may be made in form and detail without departing from the spirit and scope of the invention.

The invention claimed is:

1. A system for processing inquiry messages seeking documents comprising:
   a. a user interface receiving inquiry messages and corresponding to one or more of a plurality of resource applications running on the system, each resource application associated with a differentiated subscription, the subscription determining a level of value-added content to which the resource application has access;
   b. one or more data collections on computer-accessible memory storing documents for delivery to a user in response to an inquiry message;
   c. one or more metadata information files on computer-accessible memory holding metadata for documents stored in the one or more data collections;
   d. a new document intake component storing content of, and processing, documents that are to be added to the one or more data collections, the intake component using metadata extractors to develop metadata from a new document and to store at least a portion of the metadata in the metadata information files substantially simultaneously with storing the new document as ready for user access in the one or more data collections, the metadata comprising value-added content developed at least in part from the content of the new document as delivered to the new document intake component;
   e. a delivery component, responsive to a resource application receiving an inquiry message, delivering, through the corresponding user interface, results documents responsive to the inquiry message wherein the content of the results documents is supplemented with value-added content of the metadata associated with the results documents as determined by the subscription associated with the resource application; and
   f. at least one processor for executing the components and accessing the computer-accessible memories.

2. The system of claim 1 wherein the system comprises a table of contents service for maintaining at least one table of contents with a plurality of nodes, one or more of said nodes identifying one or more documents associated with said one or more nodes.

3. The system of claim 2 wherein the table of contents service supports two or more tables of contents, each table of contents being adapted to a particular user type.

4. The system of claim 2 wherein the at least one table of contents references documents that are in two or more data collections.

5. The system of claim 3 wherein one of the two or more tables of contents references a node in another of the two or more tables of contents to define a recursive structure.

6. The system of claim 1 wherein documents in at least one data collection are partitioned into at least one collection subset and the system has an index service that maintains an index of keywords appearing at least once in the collection subset, with an association between the keywords in the index and the location of their appearance in the collection subset.

7. The system of claim 1 wherein documents in at least one data collection are partitioned into at least one collection subset and wherein the new document intake component ensures that each additional document has a unique identifier and is assigned to at least one collection subset.

8. The system of claim 1 wherein the at least one data collection has a least one document set that is an aggregation of the documents in one or more collection subsets.

9. The system of claim 1 wherein the system further comprises a security service component that receives user identification information and inquiry messages and validates the identification information and inquiry messages against user subscription information.

10. The system of claim 1 wherein the metadata extractors process a document to cause association of the document with at least one of the following:
    a. additional editorial material prepared by a human agent;
    b. additional editorial material prepared by an automated agent;
    c. a link providing a pointer to another document in the data collection;
    d. citation based metadata to legal or bibliographic documents; or
    e. an entry associated with the document appearing in a metadata file.

11. The system of claim 1 wherein the intake component prioritizes documents and processes out of a normal order based on time of receipt documents bearing a time sensitive indicator.

12. The system of claim 1 wherein the intake component checks the uniqueness of an assigned document identifier before a new document with such document identifier is made available in any data collection.

13. The system of claim 1, wherein the intake component checks a new document for a predetermined intake format before such new document is made available in any data collection.

14. The system of claim 1 wherein the one or more data collections comprise at least 20 terabytes of information.

15. The system of claim 1 wherein the metadata developed from a new document by the intake component includes one or more brand identity attributes.

16. The system of claim 1 wherein the metadata developed from a new document by the intake component includes information for use by the resource application for one or more of overlaying, adding, deleting, and modifying one or more of data, parameters, and display formats for the document.

17. A method for delivering to users that submit inquiry messages inquiry results and documents selected from a large aggregation of electronically stored documents, comprising:
    a. providing access to a user interface associated with one or more of a plurality of resource applications running on a computer system for eliciting from a user an inquiry message in electronic form seeking documents stored in electronic form in a data collection on computer-accessible memory, each document having a unique identifier and associated enrichment attributes, the enrichment attributes comprising value-added content developed at least in part from the content of the document, wherein each resource application is associated with a differentiated subscription, the subscription determining a level of value-added content to which the resource application has access;

b. providing for the inquiry message to be delivered to a search component executing on the computer system and shared by the plurality of resource applications for processing the inquiry message to identify documents in the data collection that are responsive and retrieving at least one identifier for documents that are responsive;

c. providing to the user in response to the inquiry message a search result message from the computer system identifying one or more documents;

d. in response to a user message that selects a document from the search result message, delivering the selected document from the computer system through the user interface to the user in a predetermined format, the selected document supplemented with value-added content of the enrichment attributes selected based on at least one of the subscriptions associated with the one or more resource applications associated with the user interface; and e. associating with the selected document a point-in-time attribute, to permit detection of an updated version of the selected document.

18. A computer program embodied in a computer-readable storage medium for facilitating delivery to users that submit inquiry messages inquiry results and documents selected from a large aggregation of electronically stored documents, comprising:

a code component presenting a user interface associated with a resource application running on a computer system for eliciting from a user an inquiry message in electronic form seeking documents stored in electronic form in a data collection, each document having a unique identifier and associated enrichment attributes, the enrichment attributes comprising value-added content developed at least in part from the content of the document, and the resource application being one of a plurality of resource applications each associated with a differentiated subscription, the subscription determining a level of value-added content to which the resource application has access;

a code component providing the inquiry message to be delivered to a search component shared by the plurality of resource applications for processing the inquiry message to identify documents in the data collection that are responsive and retrieving at least one identifier for documents that are responsive;

a code component providing a search result message identifying one or more documents;

a code component responsive to document selection data, delivering the selected document to the user through the user interface in a predetermined format, the selected document supplemented with value-added content of the enrichment attributes selected based on the subscription associated with the resource application associated with the user interface and associating with the selected document a point-in-time attribute, to permit detection of an updated version of the selected document.

19. A system for retailing information sought by user inquiry messages comprising:

a. a user interface receiving inquiry messages and corresponding to a resource application running on the system, the resource application being one of a plurality of resource applications each associated with a differentiated subscription, the subscription determining a level of value-added content to which the resource application has access;

b. one or more data collections on computer-accessible memory storing documents of interest for the resource application for delivery to a user in response to an inquiry message;

c. one or more metadata information files on computer-accessible memory holding metadata for documents stored in the one or more data collections;

d. a new document intake component receiving content of and processing documents that are to be added to the one or more data collections, the intake component using metadata extractors to develop metadata from a new document and to store at least a portion of the metadata in the metadata information files substantially simultaneously with storing the new document as ready for user access in the one or more data collections, the metadata comprising value-added content developed at least in part from the content of the new document as delivered to the new document intake component;

e. security and billing service components shared by the plurality of resource applications controlling access to the one or more data collections in response to inquiry messages and developing information for billing users for access to the one or more data collections;

f. a delivery component, responsive to inquiry messages received by the resource application, delivering search results documents responsive to such inquiry messages wherein the content of the results documents is supplemented with value-added content of the metadata associated with the results documents as determined by the subscription associated with the resource application; and g. at least one processor for executing the components and accessing the computer-accessible memories.

20. The system of claim 19 wherein the one or more data collections contain one or more of the following types of information: legal, tax, accounting, medical, scientific, intellectual property, educational course material or news.

21. The system of claim 20 wherein the system further comprises a table of contents service for maintaining for each of the types of information at least one table of contents with a plurality of nodes, one or more of said nodes identifying one or more documents associated with said one or more nodes and at least one document is identified in more than one table of contents.

22. A system for processing inquiry messages seeking documents comprising:

a. a user interface receiving inquiry messages and corresponding to a resource application running on the system, the resource application being one of a plurality of resource applications each associated with a differentiated subscription, the subscription determining a level of value-added content to which the resource application has access;

b. one or more data collections on computer-accessible memory storing documents for delivery to a user in response to an inquiry message;

c. one or more metadata information files on computer-accessible memory holding metadata for documents stored in the one or more data collections;

d. a new document intake component receiving content of, and processing, documents that are to be added to the one or more data collections, the intake component using metadata extractors to develop metadata in the form of Resource Description Framework (RDF) statements from a new document and to store at least a portion of the metadata in the metadata information files substantially simultaneously with storing the new document as ready for user access in the one or more data collections, the metadata comprising value-added content developed at least in part from the content of the new document as delivered to the new document intake component;

e. a delivery component, responsive to inquiry messages received by the resource application, delivering search results documents responsive to such inquiry messages wherein the content of the results documents is supplemented with value-added content of the metadata associated with the results documents as determined by the subscription associated with the resource application; and f. at least one processor for executing the components and accessing the computer-accessible memories.

23. The system of claim 22 further comprising a table of contents service for maintaining at least one table of contents with a plurality of nodes for each of the types of information and at least one of the metadata extractors uses as vocabulary for the RDF statements, the labels of nodes of the at least one table of contents.

* * * * *

UNITED STATES PATENT AND TRADEMARK OFFICE
CERTIFICATE OF CORRECTION

| | | |
|---|---|---|
| PATENT NO. | : 7,941,431 B2 | Page 1 of 1 |
| APPLICATION NO. | : 11/433261 | |
| DATED | : May 10, 2011 | |
| INVENTOR(S) | : Mark Bluhm et al. | |

It is certified that error appears in the above-identified patent and that said Letters Patent is hereby corrected as shown below:

SPECIFICATION

| Column | Line | PTO | Should Read |
|---|---|---|---|
| 4 | 38 | and User, | and User$_z$, |
| 4 | 46-47 | Resource APP$_A$, Resource APP$_B$, | Resource App$_A$, Resource App$_B$, |
| 4 | 50-51 | (Resource APP$_A$, Resource APP$_B$, | (Resource App$_A$, Resource App$_B$, |
| 5 | 8 | Further, User, has | Further, User$_z$, has |
| 5 | 13 | Resource APP$_A$ | Resource App$_A$ |
| 5 | 17 | User$_{21}$ may be | User$_a$ may be |
| 5 | 19 | Resource APP$_A$ | Resource App$_A$ |
| 5 | 20 | Resource APP$_B$ | Resource App$_B$ |
| 13 | 35 | within a collection | within a collection set. |
| 19 | 27 | deploy-web-based | deploy web-based |

Signed and Sealed this
Thirtieth Day of August, 2011

David J. Kappos
*Director of the United States Patent and Trademark Office*